US006167218A

United States Patent [19]

Kanazawa et al.

[11] Patent Number: 6,167,218

[45] Date of Patent: Dec. 26, 2000

[54] IMAGE PRODUCTION EQUIPMENT OPERABLE UNDER VOICE DIRECTION

[75] Inventors: Toshiya Kanazawa, Tokyo; Kaori Yamada, Yokohama; Akio Suzuki; Yuka Nagai, both of Tokyo; Hiroshi Matsuda; Satoshi Okuma, both of Yokohama, all of Japan

[73] Assignee: Canon Kabushiki Kaisha, Tokyo, Japan

[21] Appl. No.: 09/414,842

[22] Filed: Oct. 8, 1999

[30] Foreign Application Priority Data

Oct. 9, 1998 [JP] Japan .................................. 10-287790
Oct. 8, 1999 [JP] Japan .................................. 11-288167

[51] Int. Cl.[7] .............................. G03G 15/00; G06F 3/16

[52] U.S. Cl. ............................... 399/81; 358/296; 399/82

[58] Field of Search .................................... 399/81, 1, 82, 399/83, 76, 77; 379/88.01, 100.01; 358/1.1, 1.15, 1.16, 296

[56] References Cited

U.S. PATENT DOCUMENTS 5,369,469 11/1994 Leo et al. ............................. 399/81 X

FOREIGN PATENT DOCUMENTS 58-168059 10/1983 Japan .
59-083242 5/1984 Japan .

*Primary Examiner*—Sophia S. Chen
*Attorney, Agent, or Firm*—Fitzpatrick, Cella, Harper & Scinto

[57] ABSTRACT

An operator depresses a voice registration key to set a voice registration mode, and registers the copy mode having been set at memory, and inputs the voice input for the copy mode registered through a microphone while depressing a voice input key, and registers the voice for the copy mode, so that a desired copy mode can be called at any time. When an operator inputs voice to call the registered copy mode while depressing the voice input key, the registered voice similar to the input voice is retrieved, and the copy mode corresponding to the voice is called from the memory and set.

30 Claims, 20 Drawing Sheets

IMAGE PRODUCTION EQUIPMENT OPERABLE UNDER VOICE DIRECTION

BACKGROUND OF THE INVENTION

1. Field of the Invention

The present invention relates to image production equipment having a mode memory function to store a plurality of image production modes and allowing access to the mode memory under voice direction.

2. Related Background Art

Conventional image production equipment can store copy modes set by an operator in its mode memory means. Usually, the numbers and/or characters registered by an operator and the copy modes having been already set are mapped into mode memory means.

When calling the copy modes stored in such mode memory means, first the numbers mapped with a plurality of copy modes into the mode memory means are displayed on a touch panel display unit as a soft key. And an operator depresses the soft keys of the corresponding numbers so as to call the contents of the copy modes and display the same on the display unit. Then the operator confirms the contents of the copy mode, so as to execute an image processing operation like copying.

However, with recent developments in image production equipment, the number of storable copy modes has increased, while the standard operating screens do not have enough space to locate all the keys for storable copy modes. Thus, the number of copy modes that can be directly called from the standard screen is limited.

Accordingly, some of the calling keys are not displayed on the standard screen, but on other screens, and an operator has to depress a plurality of keys for switching screens until the screen appears on which a required calling key is displayed.

Thus, image production equipment of the prior art has a problem such that the larger the number of storable copy modes becomes, the more keys an operator has to depress, and accordingly, the more time it takes to call the stored copy modes.

SUMMARY OF THE INVENTION

Accordingly, it is an object of the present invention to provide image production equipment designed to avoid the aforementioned drawback and a method of controlling the same.

It is another object of the present invention to provide image production equipment requiring fewer key operations and a shorter time to call desired image production modes and a method of controlling the same.

It is still another object of the present invention to provide image production equipment enabling the registration of many image production modes and an easier calling sequence thereto by mapping voice and each image production mode in registration and a method of controlling the same.

Other objects of the invention will be apparent from the following description taken in connection with the accompanying drawings and the appended claims.

DETAILED DESCRIPTION OF THE PREFERRED EMBODIMENTS

[Construction of Equipment]

Referring now to the embodiment of this invention with reference to the accompanying drawings.

Figure 1:
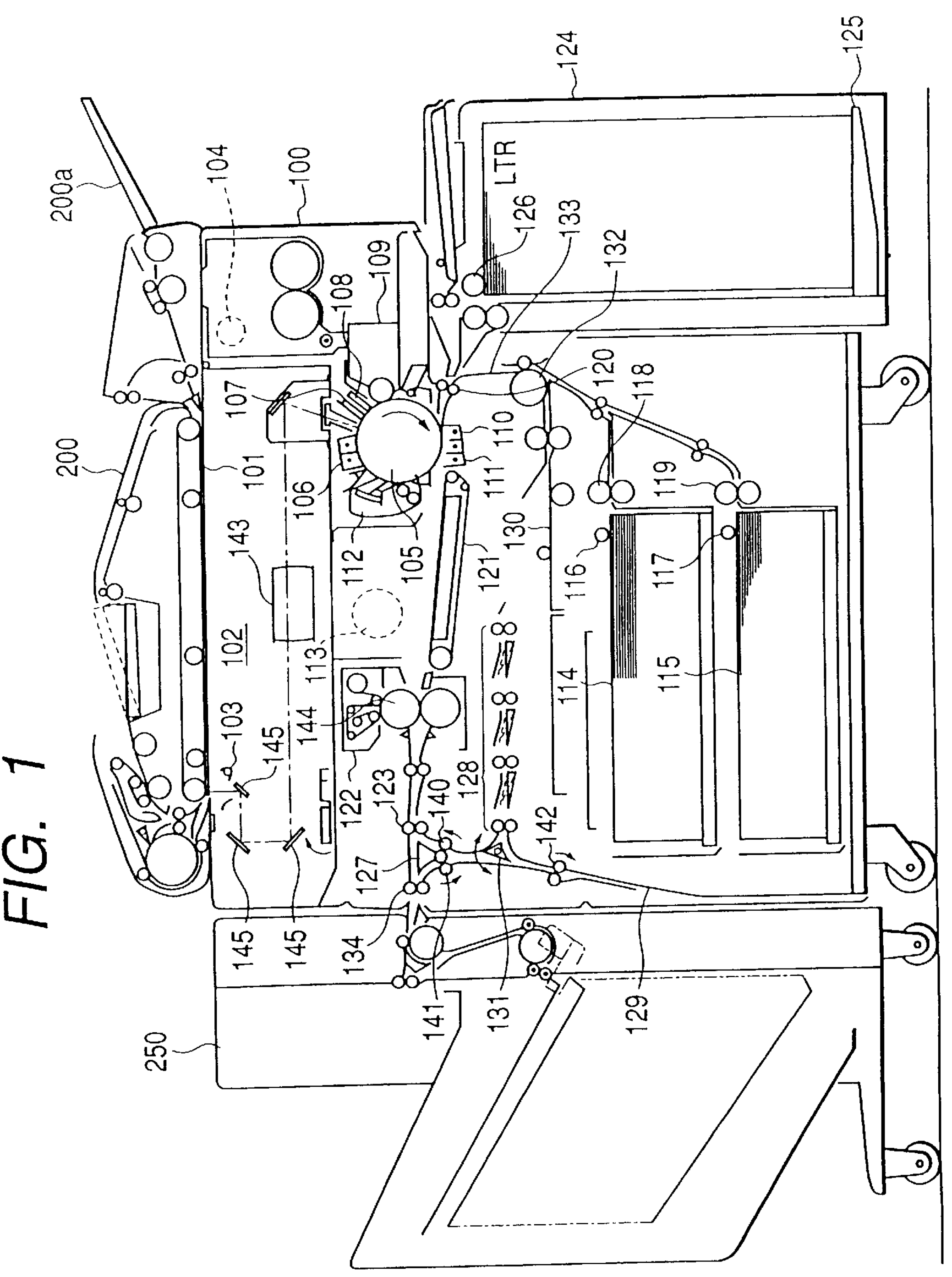
FIG. 1 is a sectional view illustrating the construction of one form of image production equipment embodying the present invention.

Referring first to FIG. 1, there is shown a sectional view illustrating the configuration of one form of image production equipment embodying the present invention. In this embodiment, image production equipment will be described by taking the case of copying equipment.

As illustrated in FIG. 1, reference numeral 100 denotes copying equipment (body). Numeral 200 denotes a rotary automatic document feeder (hereinafter referred to as RDF) for automatically feeding documents to a document stand 101. Numeral 250 denotes a sorter for sorting the transfer paper having an image produced on the sorter and discharged from the copying equipment 100. The RDF 200 and the sorter 250 are configured in such a manner that they are freely applicable in combination with the body 100. Numeral 200*a* denotes a feeder output tray for discharging the documents fed to the document stand 101 by RDF 200.

The document stand 101 is a document stand glass on which documents fed from RDF 200 is placed. Numeral 102 denotes an optical system for exposure-scanning the image of the documents placed on the document stand 101, which comprises a document illuminating lamp (exposure lamp) 103, a scanning mirror 145, a lens 143, a motor 104 or the like.

Numeral 106 denotes a primary charger, numeral 107 denotes a blank exposure unit, numeral 108 denotes an electric potential sensor, numeral 109 denotes a developing unit, numeral 110 denotes a transfer charger, numeral 111 denotes a separating charger, and numeral 112 denotes a cleaning unit. All of these are provided on the periphery of a photographic drum 105. The photographic drum 105 and all these parts 106 to 112 configure image recording means. Numeral 113 denotes a motor driving the photographic drum 105 rotationally in the direction shown by the arrow in FIG. 1.

Numeral 114 denotes an upper cassette and numeral 115 denotes a lower cassette, each of which stores transfer paper. Each of numerals 118, 119 denotes a paper-feeding roller conveying the transfer paper picked up by pickup rollers 116, 117 from the upper and the lower cassettes 114, 115 to paper-feeding roller 132. Numeral 124 denotes a deck provided for the body 100, which can store, for example, 4000 sheets of transfer paper. Numeral 125 denotes a lifter, which rises according to the quantity of the transfer paper so that the transfer paper stored in the deck 124 always comes in contact with the paper-feeding roller 126.

Numeral 120 denotes a resist roller, which conveys transfer paper to the photographic drum 105 in such a manner that the timing of the tip of the transfer paper conveyed by the paper-feeding roller 132 or the paper-feeding roller 126 of the deck 124 matches that of the tip of the toner image developed on the photographic drum 105.

Numeral 121 denotes a conveyer belt for conveying the transfer paper to which a toner image has been already transferred to a photographic fixing device 122. Numeral 122 denotes a photographic fixing device, which fixes a toner image on the transfer paper by heating under pressure by a photographic fixing roller 144. Numeral 123 denotes a discharge roller, which discharges the transfer paper on which a toner image has been already fixed. Numeral 127 denotes a feeder output flapper, which allows the conveyer path the transfer paper fed from the discharger roller 123 to be switched between the two-face or multiple recording side and the output side (sorter 250). In the case where two-face recording or multiple recording has been set, the feeder output flapper switches the conveyer path of the transfer paper fed from the discharge roller 123 to the two-face or multiple recording side.

Numeral 128 denotes a lower conveyer path 128, which turns the transfer paper fed from the discharge roller 123 over via a reverse path 129 and introduces it to a paper re-feeder 130. Numeral 131 denotes a multiple flapper, which allows the conveyer path to be switched from the two-face recording operation and the multiple recording operation. Slanting the multi-flapper leftward makes it possible to introduce the transfer paper directly to the lower conveyer path 128, which makes it unnecessary to introduce the transfer paper via the reverse path. Numeral 130 denotes a paper re-feeder, which stores the transfer paper fed from the lower conveyer path 128 for a time.

The paper-feeding roller 132 feeds the transfer paper toward the photographic drum 105 through a path 133. Numeral 134 denotes a feeder output roller, which is located in the vicinity of the feeder output flapper 127 and discharges the transfer paper switched to the discharge side by the feeder output flapper out of the equipment.

Now the operation of the equipment will be described. The motor 104 drives the exposure-lamp 103 and the scanning mirror to scan and light up the document placed on the document stand 101 at the same time by the exposure-lamp 103, and the photographic drum 105 is illuminated with the reflected light of the document via the scanning mirror 145 and the lens 143.

The photographic drum 105 is driven by a main motor 113 to rotate in the direction shown by the arrow in FIG. 1, where the surface of the photographic drum 105 is subjected to corona electrical charging by the primary charger 106. When lighting up with the reflected light of the document from the optical system 102, the photographic drum 105 has an electrostatic latent image formed on its surface. The electrostatic latent image is developed by the developing unit to become a visible toner image.

On the other hand, the transfer paper conveyed from the upper cassette 114 or the lower cassette 115 into the body 100 by the paper-feeding roller 118 and 119 via pickup roller 116 and 117, is fed to the photographic drum 105 and a toner image is transferred by the transfer change 110, after the resist roller 120 takes such a timing that tip of the toner image may be consistent with the tip of the transfer paper.

After transferring the toner image to the transfer paper, the transfer paper is separated from the photographic drum 105 by the separating charger 111, and introduced to the photographic fixing device 122 by the conveyer belt 121, so that the toner image is fixed thereto by applying heat and pressure. Then the transfer paper is discharged through the discharging roller 123. And the surface of the photographic drum 105 is cleaned with a cleaning unit 112.

In the case of two-face recording (two-face copying) or multiple recording (multiple copying), after raising the feeder-output flapper 127, the copied transfer paper is fed to the paper re-feeder 130 via the reversal path 129 and the conveyer path 128 and stored therein with its image-recorded surface upward, in the case of two-face copying, or with its image-recorded surface downward, in the case of multiple recording. At this time, in the case of two-face copying, the multiple flapper 131 is slanted rightward of the figure and, in case of multiple copying, the multiple flapper 131 is slanted leftward of the same.

In subsequent back-face recording or multiple recording, the transfer paper stored in the paper re-feeder 130 is introduced, sheet-by-sheet, in a bottom-to-top order to the resist roller 120 of the body by the paper-feeding roller 132 via the path 133. In the case where the transfer paper is discharged from the body 100 with its faces reversed, after raising the feeder-output flapper 127 and slanting the multiple flapper 131 rightward of the figure, the copied transfer paper is conveyed toward the conveyer path 129, then conveyed toward a second feeding roller 141 via the reversal roller 142 after its rear end has passed through a first feeding roller 140, and finally it is discharged out of the equipment via discharging roller 134 with its faces reversed.

Figure 2:
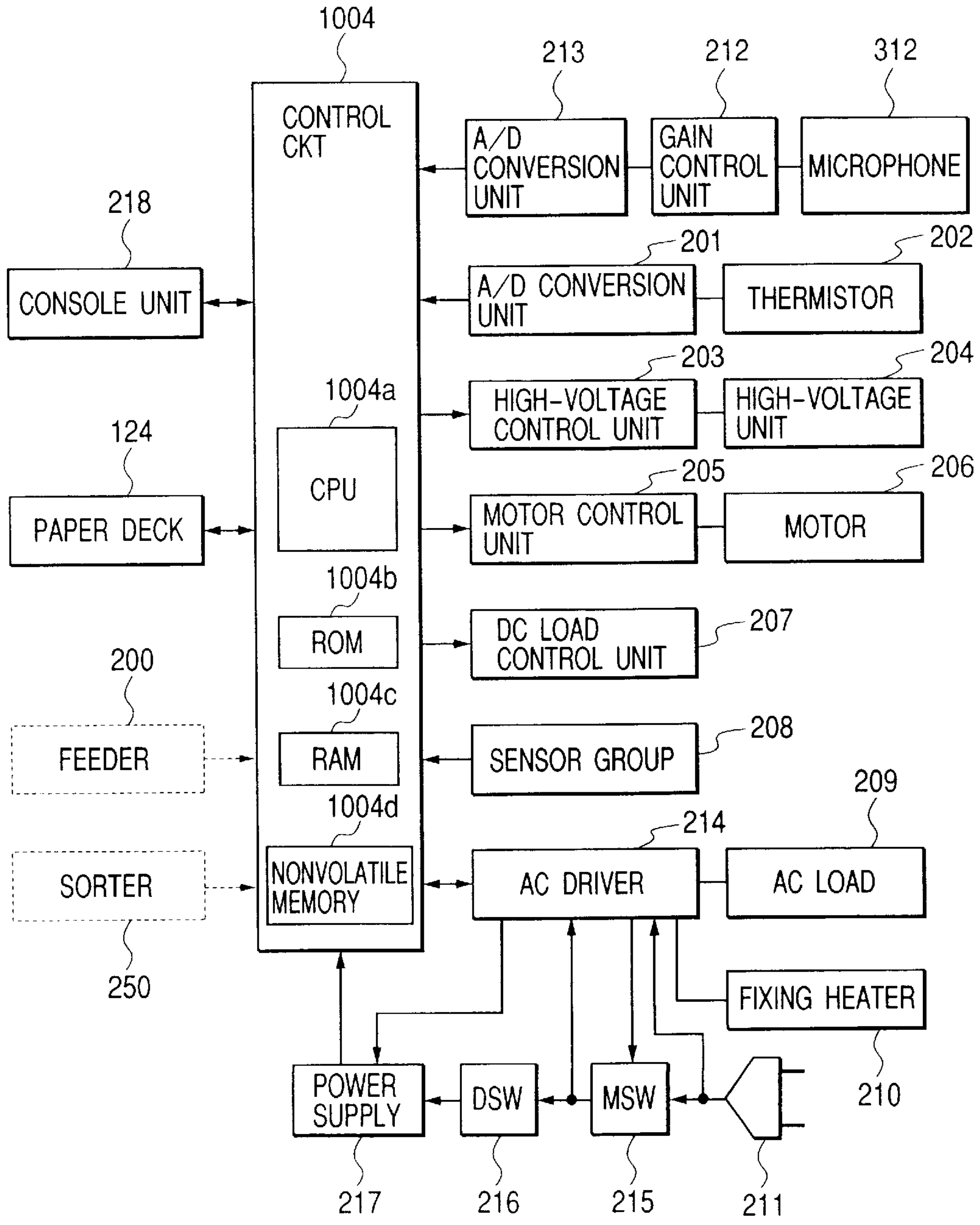
FIG. 2 is a block diagram illustrating one form of a control system for controlling image production equipment embodying the present invention.

Referring now to FIG. 2, there is shown a block diagram illustrating one form of control system for controlling the image production equipment embodying the present invention.

As illustrated in FIG. 2, reference numeral 1004 denotes a control circuit (controller), which comprises CPU 1004*a*, ROM 1004*b*, RAM 1004*c*, nonvolatile memory 1004*d* or the like, and as described below controls the copying sequence together based on the control program stored in ROM 1004*b*. RAM 1004*c* is used for the work area of CPU 1004*a*.

Numeral 1004*d* denotes a nonvolatile memory, which comprises a hard disc, a flash memory, an EEPROM, and an EPROM or the like and, as described below, stores memory keys, setting copying modes, names corresponding to the above copying modes, and the registered voice corresponding to the above copying modes in such a manner that all of them are mapped into the memory. The registered voice is input into the controller 1004 via a mike 312, a gain control unit 212, and an A/D conversion unit 213.

Numeral 218 denotes a console unit (or operation unit). In the unit provided are a key input unit comprising keys for setting copying modes (one-face/two-face/multiple modes, magnifying power, cassette selection etc.), a group of ten keys for setting a copy quantity, a start key for instructing the start of a copying operation, a stop key for instructing stopping of the copying operation, a reset key for returning a set operating mode to the standard state etc. and a display unit, such as a LED display and a liquid crystal display, for displaying the setting state of each operating mode. The details will be explained with reference to FIG. 3 below.

Numeral 201 denotes an analog to digital (A/D) conversion unit, which converts the analog signals representing the surface temperature of the photographic fixing roller 144 detected by a thermistor 202 into digital signals and inputs the above converted digital values into the controller 1004. Incidentally, the controller 1004 controls the surface temperature of the photographic fixing roller 144 to be kept at a prescribed value based on the value detected by the thermistor 202.

Numeral 203 denotes a high-voltage control unit, which controls a high-voltage unit 204 for applying a prescribed voltage to the charging system, such as a first charger 106 and the transfer charger 110, the developing unit 109 or the like. Numeral 205 denotes a motor control unit, which controls the driving of motors 206, such as various types of stepping motors and a main motor.

Numeral 207 denotes a DC load control unit, which controls the driving of solenoids (not appear in the figure) for the pickup roller 116, clutches and fans for the resist roller 120 and so on.

Numeral 208 denotes a sensor group, which comprises various types of sensors, such as a sensor for detecting the clogging of the transfer paper, and the results detected by these sensors are inputted to the controller 1004.

Numeral 312 denotes a mike, which detects the input of voice. Numeral 212 denotes a gain control unit, which adjusts the volume of the voice input from the mike 312 to the optimum level for voice recognition. Numeral 213 denotes an A/D conversion unit for converting analog signals into digital signals, which performs A/D conversion of voice input from the gain control unit 212. The above-converted values are input into the controller 1004 where voice recognition is performed.

Numeral 214 denotes an AC driver, which controls the AC power supply to the AC load 209, such as a document illuminating lamp 103 shown in FIG. 1, and the photographic fixing heater 210 while detecting abnormal conditions thereof. If necessary, it turns a main switch (MSW) with shutoff function 215 off. Further, AC input before and after the main switch 215 is switched by the control of the controller 1004 and input into a power supply 217.

Numeral 217 denotes a power supply, which supplies a DC power supply to the controller 1004 or the like, and, at the same time, into which an AC power supply is input from the AC driver 214 as well as from an input power supply plug 211 via the main switch (MSW) 215 and a door switch (DSW) 216.

A paper deck 124 is a paper-feeding unit for increasing the quantity of transfer paper stored in the equipment, a feeder 200 is an automatic document-feeding unit for automatically setting multiple pieces of paper, and a sorter 250 is a sorting unit for sorting the transfer paper discharged from the equipment.

[Description of the Console Unit]

Figure 3:
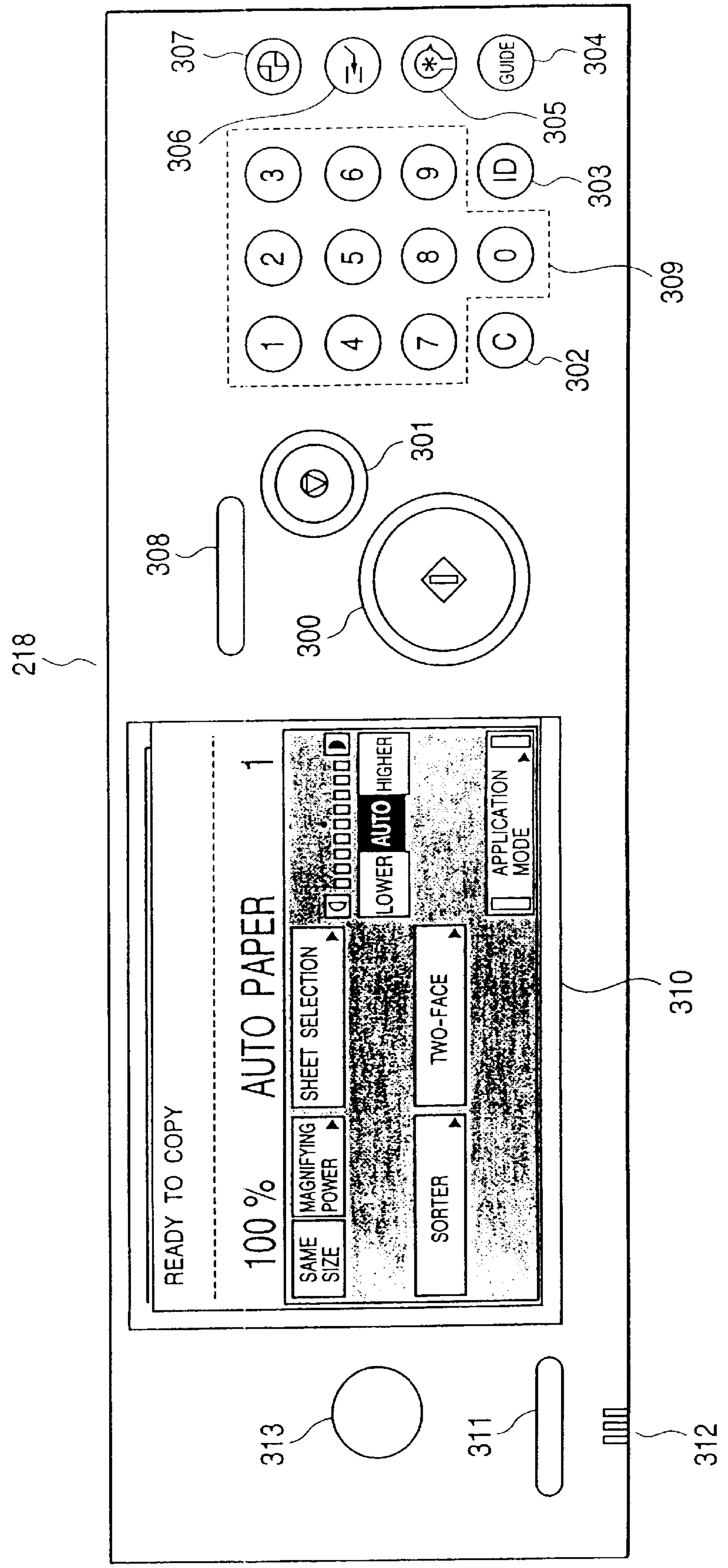
FIG. 3 is a plan view illustrating one form of a console unit configuration of the present invention.

Referring to FIG. 3, there is shown a plan view illustrating one example of the configuration of the console unit 218 shown in FIG. 2.

As illustrated in FIG. 3, numeral 300 denotes a COPY START key, which is depressed when starting a copying operation. Numeral 301 denotes a STOP key, which is depressed when stopping (canceling, aborting) copying. Numeral 302 denotes a CLEAR key, which is depressed when clearing input values.

Numeral 303 denotes an ID key, which allows a specific operator alone to perform a copying operation and can disable copying operations unless ID is input through the ID key.

Numeral 304 denotes a GUIDE key, which is depressed when the operator needs an explanation of the functions copying equipment 100, RDF 200, a sorter 250 etc. Numeral 305 denotes an OPERATOR MEMORY key, which is depressed when setting the specifications and conditions of copying the equipment 100, the RDF 200, the sorter 250, etc. An operator mode includes a function setting (two types) for assigning a desired function to a key, a specification setting, a timer setting, and an adjustment/cleaning setting.

Numeral 306 denotes an INTERRUPT key, which is depressed when interrupting the copy to perform another copy. Numeral 307 denotes a PREHEAT key, which is depressed when shifting to a preheat mode which allows a lower power consumption or when wanting to return therefrom. Numeral 308 denotes a RESET key, which is depressed when returning a copy mode to the standard copy mode. Numeral 309 denotes a group of keys of a numeric pad, which are used for inputting numeric a values of, for example, a magnifying power, a copy quantity, and so on.

Numeral 310 denotes a liquid crystal display console unit, which displays the state of the copying equipment 100, RDF 200, the sorter 250, etc. and the setting conditions of copying modes. The screen displayed on the unit can be changed and shifted by touching the soft key displayed on it so as to perform copying mode settings or the like. Numeral 311 denotes a VOICE INPUT key. Depressing the key makes possible voice input from the mike 312. Numeral 313 denotes a VOICE REGISTRATION key. Depressing the key allows a voice-registration screen 700*a* to be displayed.

Figure 4:
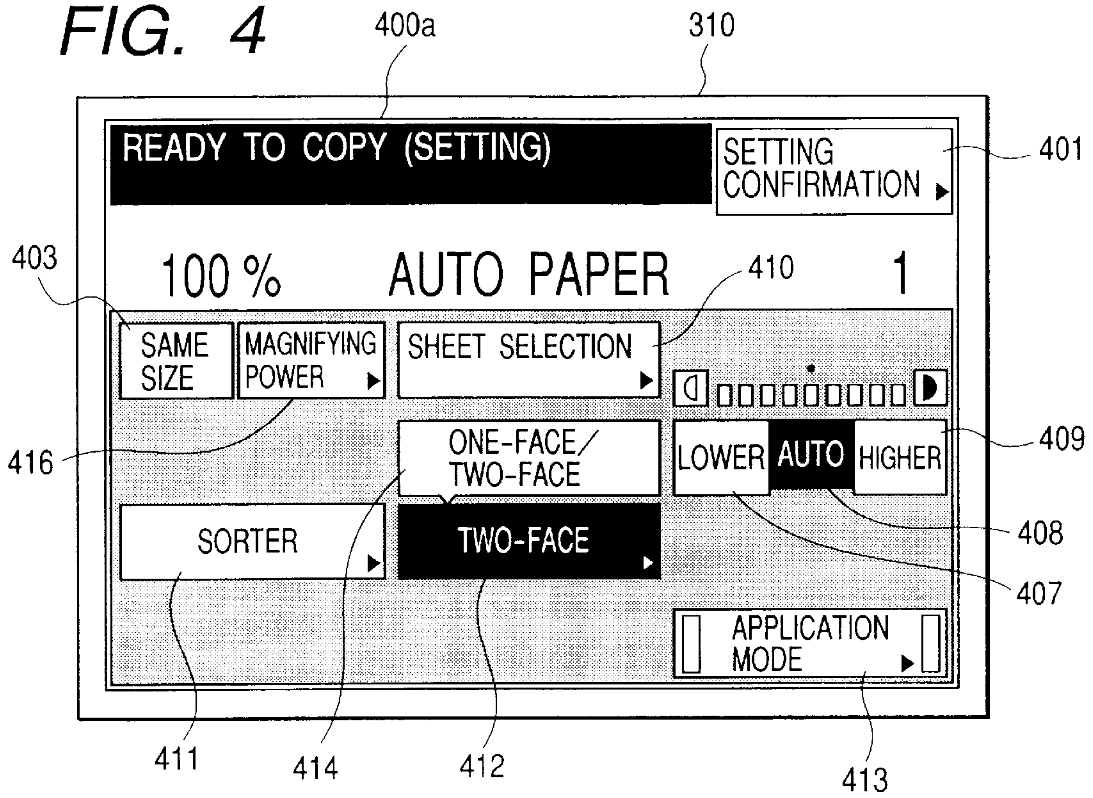
FIG. 4 shows one example of the screens displayed on the liquid crystal display console unit.

Referring to FIG. 4, there is shown a plan view illustrating one example of the screen displayed on the liquid crystal display console unit 310 shown in FIG. 3.

As illustrated in FIG. 4, numeral 400*a* denotes a standard screen (basic screen). The screen is displayed on the liquid crystal display console unit 310 when the equipment is in the standard state, for example, at the time of turning on the equipment, after depressing the RESET key 308 shown in FIG. 3, after completing the copying operation and so on. Numeral 401 denotes a state display, which displays the state of the copying equipment 100, RDF 200, the sorter 250, etc., and the copy quantity and the magnifying power which have been already set, the paper size specified and so on.

Numeral 403 denotes a SAME SIZE key, which is depressed when performing a 100% same-size copying.

Numeral 416 denotes a ZOOM key, which is depressed when copying is performed to set the magnifying power. In particular, it is depressed when using an automatic zoom function, which automatically calculates the magnification power based on the document size and paper size or when using a zoom program function which calculates the magnification power based on the specified image size of the document and the specified image size after copying.

Numerals 407 and 409 denote CONTRAST CONTROL keys. The key 407 is depressed when making the contrast lower, while the key 409 is depressed when making the contrast higher. Numeral 408 denotes an AE key, which is depressed when automatically adjusting the contrast based on the contrast of the document.

Numeral 410 denotes a PAPER SELECTION key, which is depressed when using an automatic paper selection (APS) function, which automatically selects the paper size based on the document size and the magnifying power or when specifying the paper size. Numeral 411 denotes a SORTER key, which is displayed only when the sorter 250 is mounted on the equipment and depressed when setting the output form of the sorter 250 (non-sorted, sorted, group-sorted, staple-sorted, etc.) and the location of the staple.

Numeral 412 denotes a TWO FACE key, which is depressed when outputting the document image having been read onto both sides of the transfer paper or when handling two-face documents. Numeral 413 denotes an APPLICATION MODE key, which is depressed when using various functions the copying equipment has. When depressing the APPLICATION MODE key 413, an application mode screen 400*b* shown in FIG. 5, which is described below, is displayed. Numeral 414 denotes a field for displaying the details of setting, in which the type of two-face copying is displayed if two-face copying has been already set (if the two-face key 412 is reversed).

Figure 5:
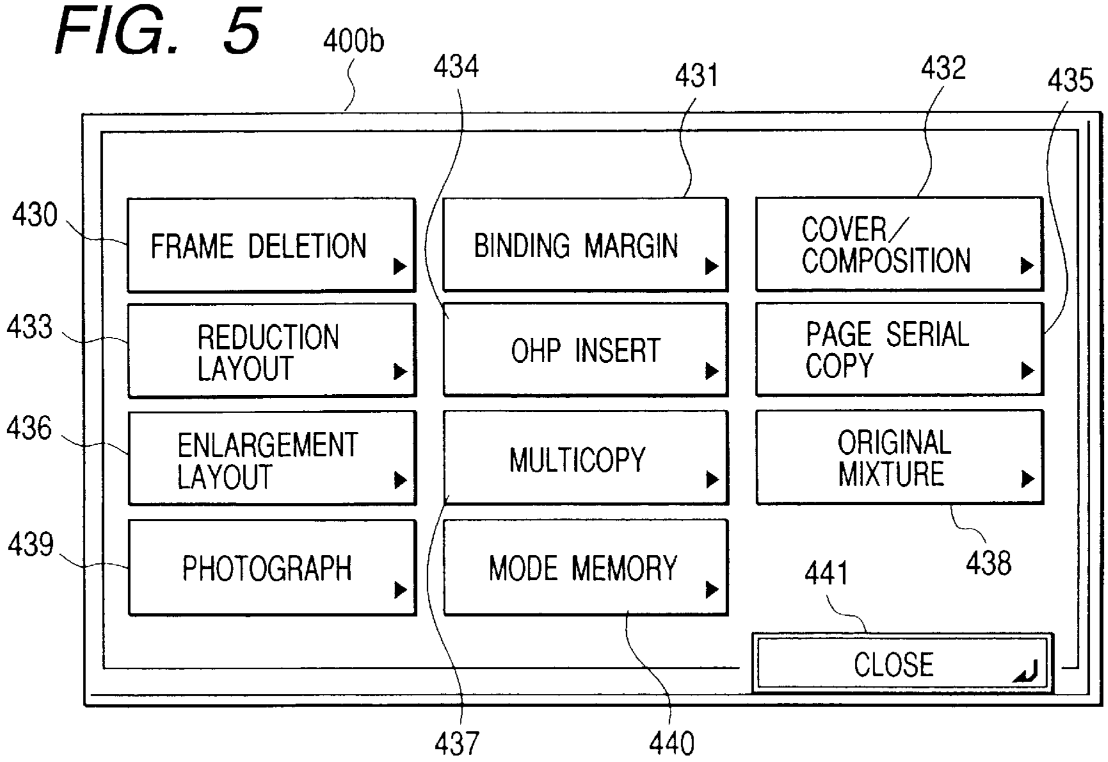
FIG. 5 shows a screen right after selecting an application mode.

As illustrated in FIG. 5, numeral 400*b* denotes an application mode screen, which is displayed when depressing the APPLICATION MODE key 413, as described above. Numeral 430 denotes a FRAME DELETION key, which is depressed when deleting a frame according to the mode having been set. The frame deletion modes include, for example, a sheet frame deletion mode (the frame is made of the same size as the sheet), a document frame deletion mode (the frame is made of the same size as the document, where the document size is specified), a book frame deletion mode (the frame is made of the same size as the two-page spread of the book and the center is made blank, where the size of the two-page spread is specified), and a punched hole deletion mode (when copying the document having punched holes in it, the punched parts are made blank so that the image of the holes cannot be copied).

Numeral 431 denotes a BINDING MARGIN key, which is depressed when creating a binding margin (top, bottom; left and right). Numeral 432 denotes a COVER/COMPOSITION key, which is depressed when inserting a cover, a back cover and a composition into the output. Numeral 433 denotes a REDUCTION LAYOUT key, which is depressed when copying a plurality of documents together on a sheet of transfer paper with the document size being reduced or enlarged. For example, when four sheets of documents are copied together on a single sheet of transfer paper, 4-in-1 is specified, and when two sheets of documents are copied together on a single sheet of transfer paper, 2-in-1 is specified.

Numeral 434 denotes an OHP insert key, which is depressed when setting a mode where insertion is automatically made in copying using OHP sheets. Whether copying is performed on the inserted sheets or not copying is also set using the OHP insert key. Numeral 435 denotes a PAGE SERIAL COPY key, which is depressed when page serial copying is performed in such a manner that the copying area of the document placed on the document stand glass 101 is divided into two and each of the divided images is automatically copied on two sheets of transfer paper (for example, right-to-left book, left-to-right book or reversal feeder output is specified).

Numeral 436 denotes an ENLARGED LAYOUT key, which is depressed when setting a mode where the image copied in a reduction layout mode is returned to the former image. Numeral 437 denotes a MULTIPLE key, which is depressed when copying is performed, for example, in a multiple mode or a page serial mode. Numeral 438 denotes an ORIGINAL MIXTURE key, which is depressed when copying is performed using RDF 200 where different sizes of documents are placed in RDF 200.

Numeral 439 denotes a PHOTOGRAPH key, which is depressed when copying photographic documents. Numeral 440 denotes a MODE MEMORY key, which is depressed when storing any arbitrary combinations of modes (copying modes), for example, the copy quantity, the contrast, and the magnifying power, set by an operator, or when calling copying modes having been already stored. Numeral 441 denotes a CLOSE key, which is depressed when ending the application mode screen 400*b*. Depressing this key allows the standard screen 400*a* shown in FIG. 4 to be displayed on the liquid crystal display console unit 310.

Now each of the screens displayed on the liquid crystal display console unit 310 when performing a two-face mode setting and a voice registration will be described with reference to FIGS. 6 to 13.

Referring to FIGS. 6 to 13, there are shown plan views each illustrating one example of the screens displayed on the liquid crystal display console unit 310 when performing a two-face mode setting, a voice registration, and a voice setting/calling.

Figure 6:
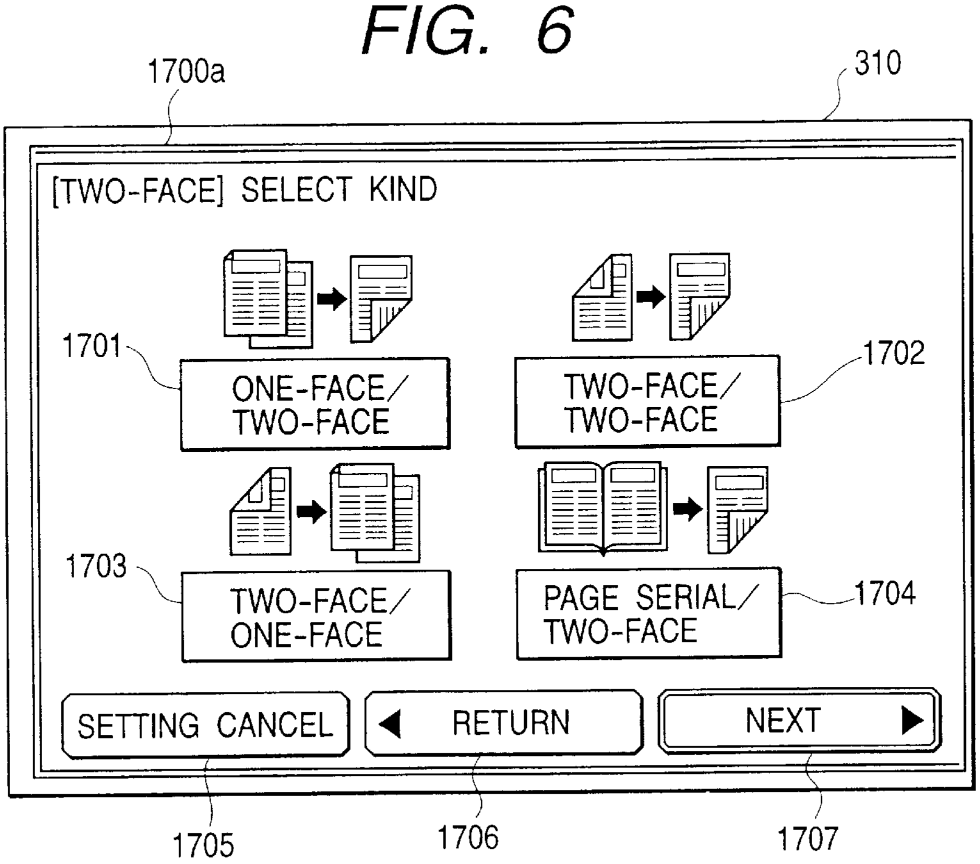
FIG. 6 shows a screen right after selecting a two-face mode.

As illustrated in FIG. 6, numeral 1700*a* denotes a TWO-FACE KIND SELECTION window, which is displayed on the liquid crystal display console unit 310 when depressing the TWO-FACE key 412 shown in FIG. 4.

Numeral 1701 denotes a ONE-FACE/TWO-FACE key, which is depressed when performing two-face copying from one-face documents. Numeral 1702 denotes a TWO-FACE/TWO-FACE key, which is depressed when performing two-face copying from two-face documents. Numeral 1703 denotes a TWO-FACE/ONE-FACE key, which is depressed when performing one-face copying from two-face documents. Numeral 1704 denotes a PAGE SERIAL TWO-FACE key, which is depressed when performing two-face copying of a right-and-left two-page spread from, for example, a book. Numeral 1705 denotes a SETTING CANCEL key, which is depressed when canceling a two-face setting. Numeral 1706 denotes a RETURN key, which is depressed when returning a setting to the standard screen 400*a* after confirming the setting. Numeral 1707 denotes a NEXT key, which is depressed when shifting to a new screen after deciding a new setting.

However, the TWO-FACE/TWO-FACE key 1702 and the PAGE SERIAL TWO-FACE key 1704 are not displayed, but an OK key is displayed.

The kind of two-face setting selected is determined by depressing the OK key.

Figure 7:
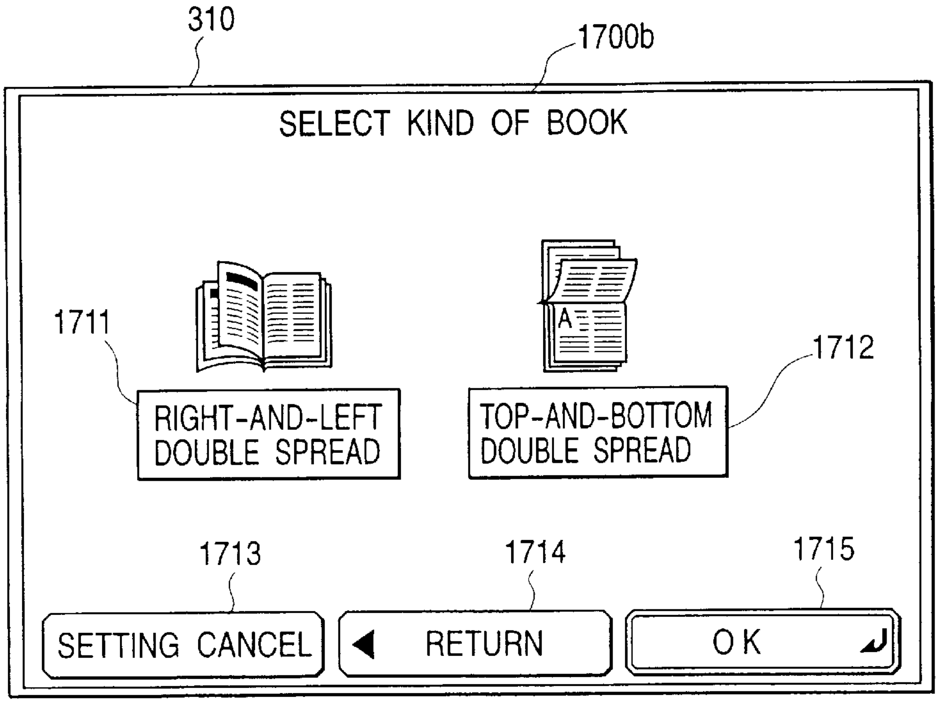
FIG. 7 shows a screen for selecting a kind of document in performing two-face copying.

As illustrated in FIG. 7, numeral 1700*b* denotes a DOCUMENT SPREAD KIND SELECTION window, which is displayed on the liquid crystal display console unit 310, for example, when a NEXT key 1707 on the TWO-FACE KIND SELECTION window shown 1700*a* in FIG. 6 is depressed. Numeral 1711 denotes a RIGHT-AND-LEFT DOUBLE SPREAD key, which is depressed when printing is performed for a right-and-left double spread. Numeral 1712 denotes a TOP-AND-BOTTOM DOUBLE SPREAD key, which is depressed when printing is performed for a top-and-bottom double spread. Numeral 1713 denotes a SETTING CANCEL key, which is depressed when canceling two-face settings. Numeral 1714 denotes a RETURN key, which is depressed when returning a setting to the TWO-FACE KIND SELECTION window 1700*a* after confirming the setting. Numeral 1715 denotes an OK key, which is depressed when making a setting valid.

Figure 8:
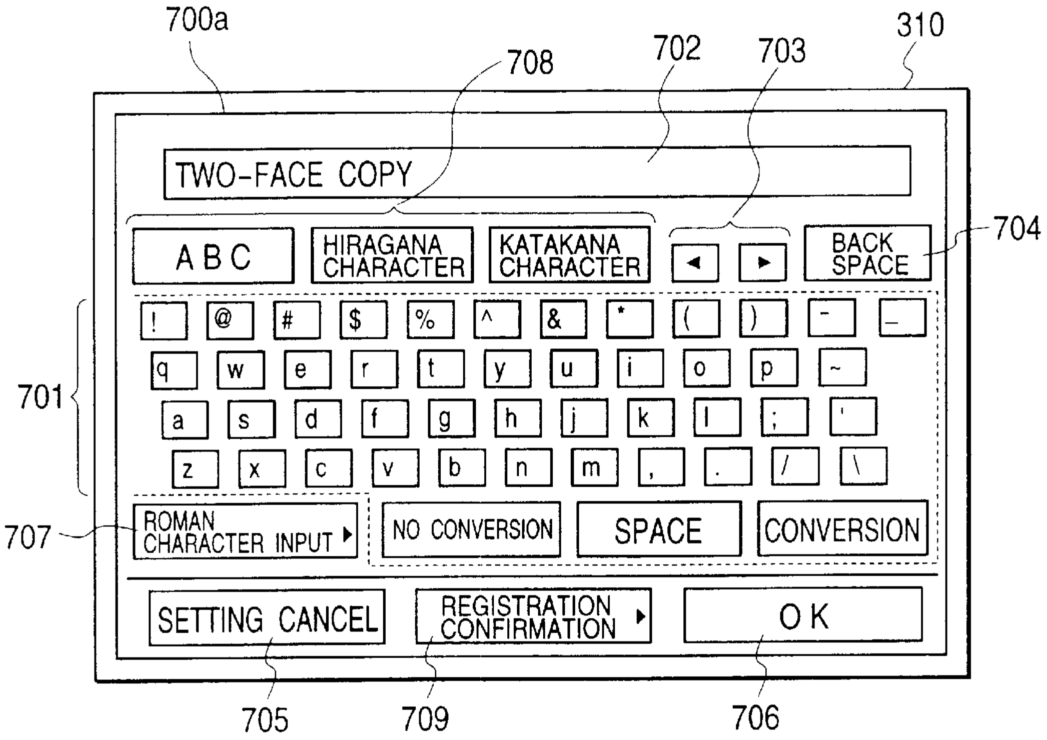
FIG. 8 shows a screen of a keyboard in a voice registration mode.

As illustrated in FIG. 8, numeral 700*a* denotes a NAME REGISTRATION window, which is a screen displayed on the liquid crystal display console unit 310 when inputting a name for voice registration. Numeral 708 denotes a CHARACTER SWITCH key and the type of the characters displayed on a keyboard 701 is switched each time an ALPHABET key, a HIRAGANA CHARACTER key or a KATAKANA CHARACTER key is depressed. Numeral 707 denotes a ROMAN CHARACTER INPUT key, which is displayed only on alphabet input and is depressed when performing hiragana character input with roman character. When depressing character keys (alphabet, symbols etc.) displayed on the keyboard 701, characters corresponding to each key are displayed on a CHARACTER DISPLAY field 702. The configuration of this screen is such that, when inputting numeric values in this screen, they are input from a group of keys on the numeric pad 309 of the console unit 218.

Numeral 703 denotes a CURSOR MOVE key, which is depressed when moving the cursor displayed on the CHARACTER DISPLAY field 702. Numeral 704 denotes a BACK SPACE key, which is depressed when deleting the character immediately before the cursor. Numeral 705 denotes a SETTING CANCEL key, which is depressed when canceling voice registration. Numeral 706 denotes an OK key, which is depressed when ending a character-string input. Numeral 709 denotes a REGISTRATION CONFIRMATION key, which is depressed when confirming and deleting the registered character string registered and setting.

Figure 9:
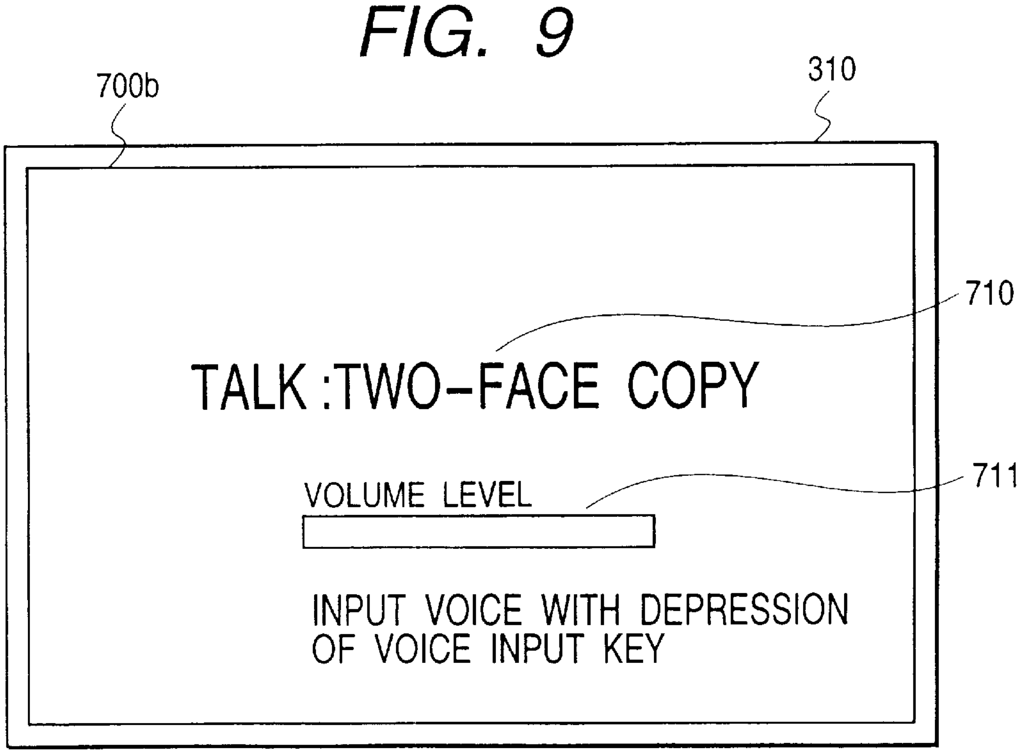
FIG. 9 shows a screen in performing voice input for voice registration.

As illustrated in FIG. 9, numeral 700*b* denotes a VOICE INPUT window, which is displayed when the OK key 706 shown in FIG. 8 is depressed. On the window an operating procedure for voice input and a message prompting an operator to perform voice input are displayed. Numeral 710 denotes a REGISTERED CHARACTER DISPLAY field, which displays the character string input on the NAME REGISTRATION window shown in FIG. 8. Numeral 711 denotes a VOICE LEVEL DISPLAY field, which displays the level of voice (for example, volume level) input from the microphone 312.

Figure 10:
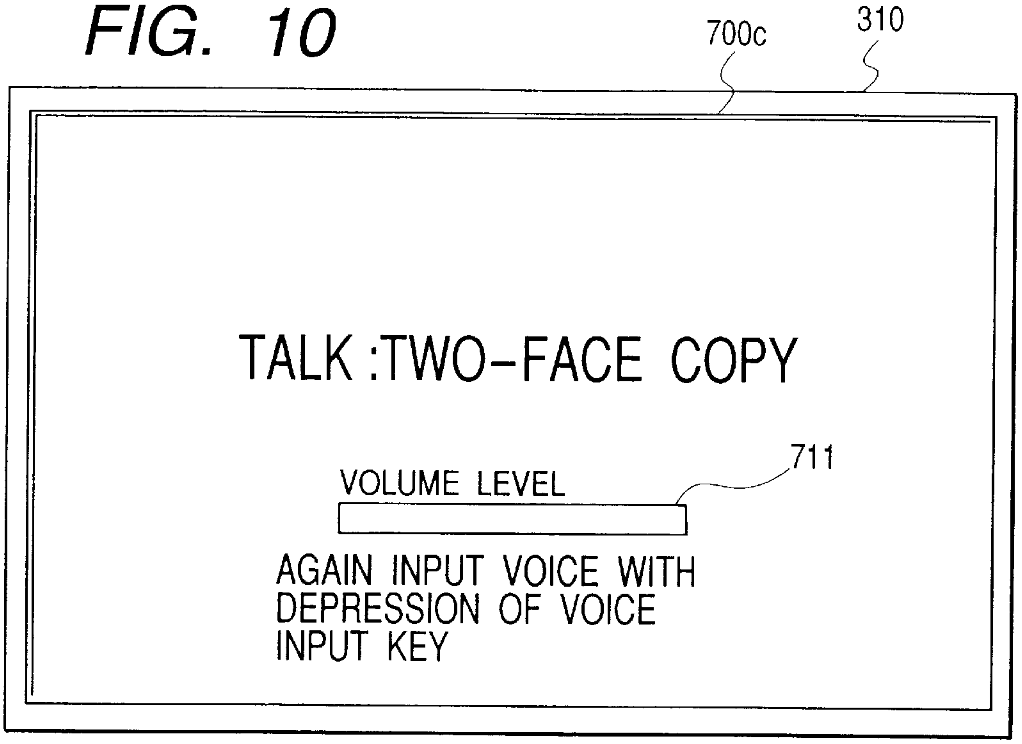
FIG. 10 shows a screen in performing voice re-input for voice registration.

As illustrated in FIG. 10, numeral 700*c* denotes a VOICE RE-INPUT window, which is displayed when re-inputting voice for confirmation after inputting voice from the VOICE INPUT window 700*b* displayed on the liquid crystal display console unit 310.

Figure 11:
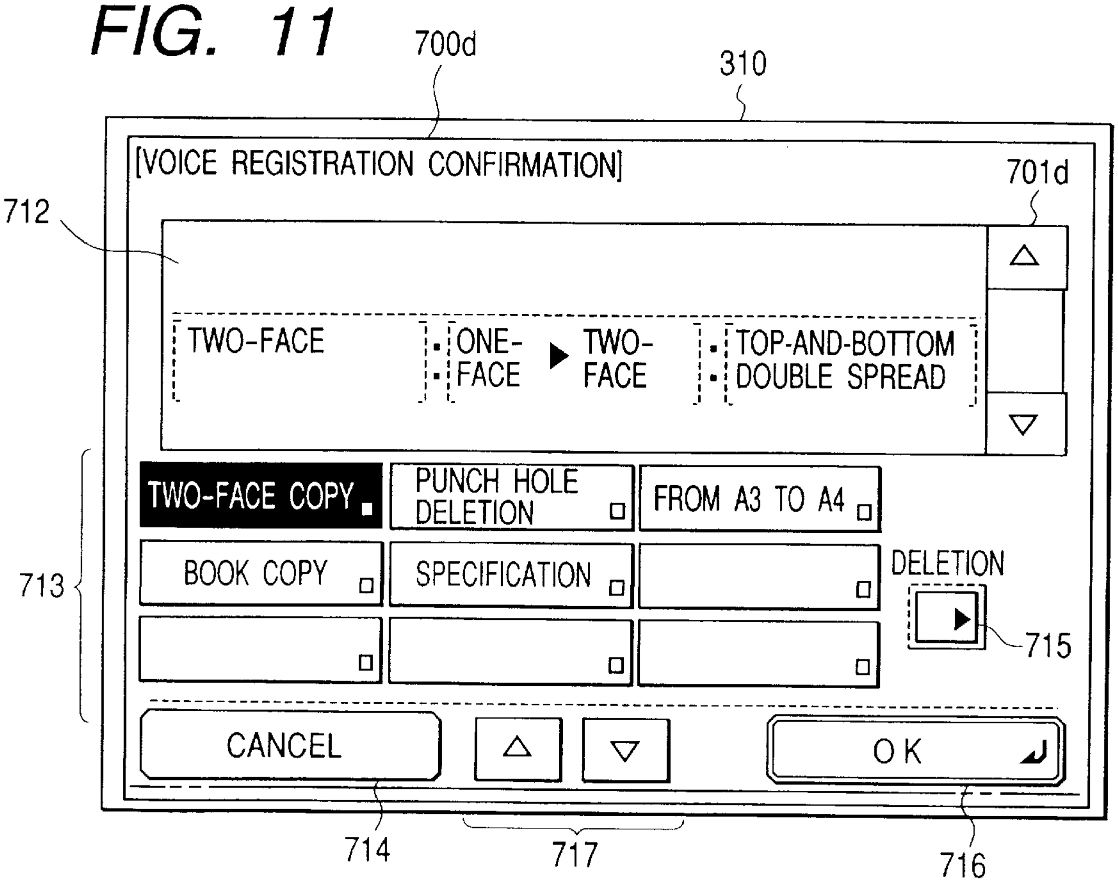
FIG. 11 shows a screen for confirming voice registration.

As illustrated in FIG. 11, numeral 700*d* denotes a VOICE REGISTRATION CONFIRMATION window, which is displayed on the liquid crystal display console unit 310, for example, when depressing the REGISTRATION CONFIRMATION key 709 on the NAME REGISTRATION window 700*a* shown in FIG. 8. Numeral 712 denotes a REGISTRATION CONTENTS DISPLAY field, which displays the registration contents corresponding to the selected REGISTRATION NAME key 713 when any one of the REGISTRATION NAME keys assigned to each registration name is depressed and displayed in the reverse state (in the selected state). Numeral 701*d* denotes a scroll key, which is depressed when scrolling the registration contents so that they can be displayed even when all the registration contents cannot be displayed within the frame of the REGISTRATION CONTENTS DISPLAY field 712. Any number of REGISTRATION NAME keys can be added, as far as the storage capacity permits.

Numeral 715 denotes a DELETION key, which is depressed when deleting the registered setting. Numeral 714 denotes a CANCEL key, which is depressed, for example, when canceling a deletion. Numeral 717 denotes a SCROLL key, which is depressed when scrolling the registration names so that they can be displayed even when all the REGISTRATION NAME key 713 can be displayed within the frame of the REGISTRATION CONTENTS DISPLAY field 712. Numeral 716 denotes an OK key, which is depressed when making a setting, for example, for deletion valid.

Figure 12:
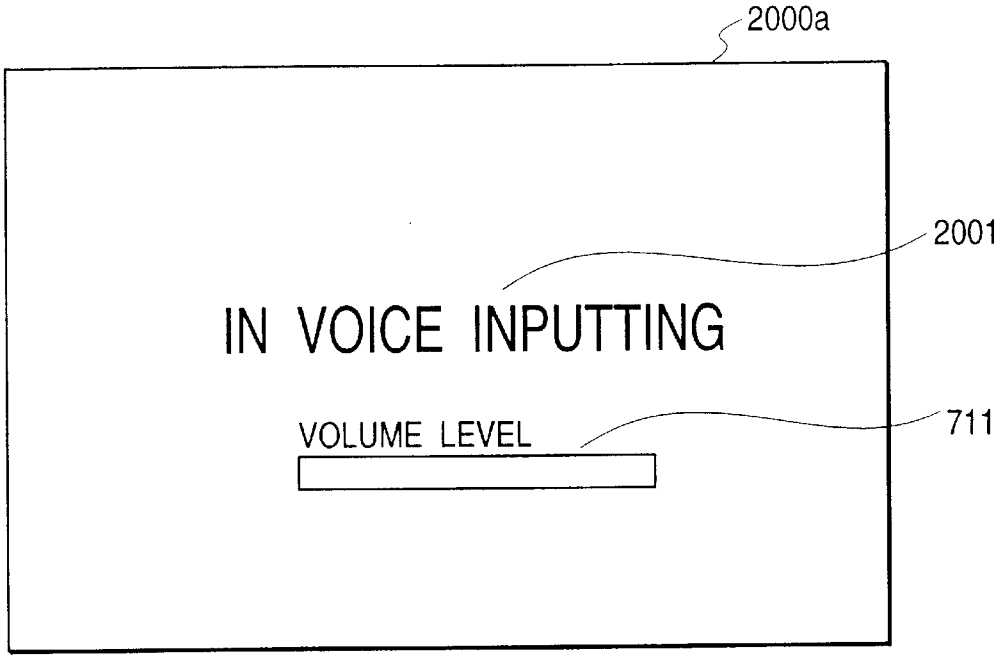
FIG. 12 shows a screen at the time of calling copy modes with voice.
Figure 13:
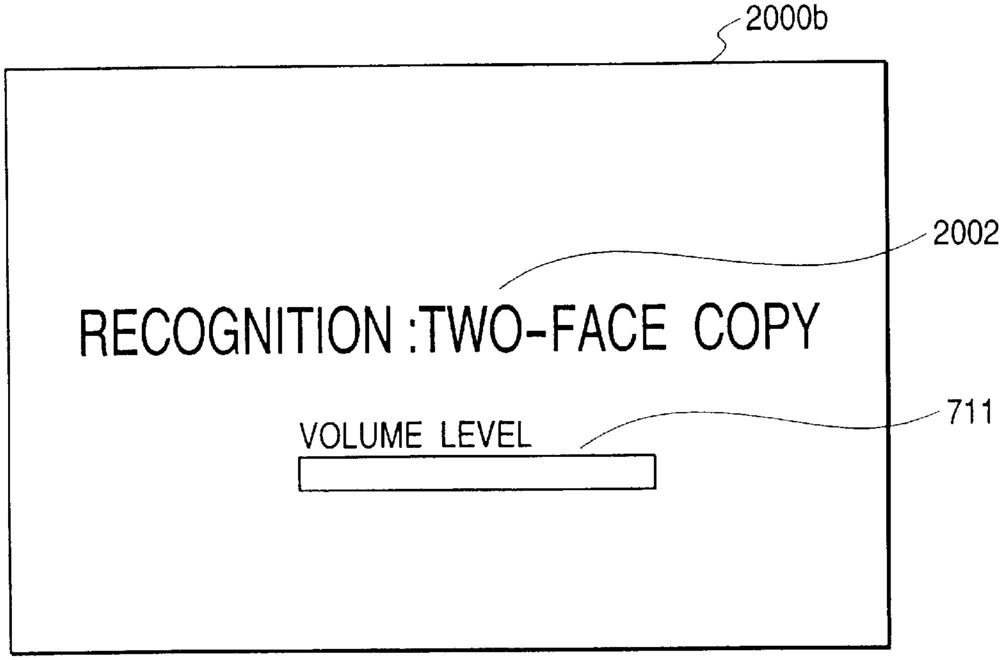
FIG. 13 shows a screen at the time of calling a copying mode with voice.

As illustrated in FIG. 12, a VOICE INPUT window 2000*a* is displayed on the standard screen 400*a*, for example, when depressing the VOICE INPUT key 311. Numeral 2001 denotes a STATE DISPLAY field, which shows voice is on input. Among the voices previously registered, the one most similar to the input voice is displayed as the recognition result on the RECOGNITION RESULT DISPLAY field 2002 of the VOICE RECOGNITION RESULT DISPLAY window 2000*b* shown in FIG. 13.

Now the flow chart for two-face (one-face to two-face/top-and-bottom double spread) settings will be described with reference to FIG. 14.

Figure 14:
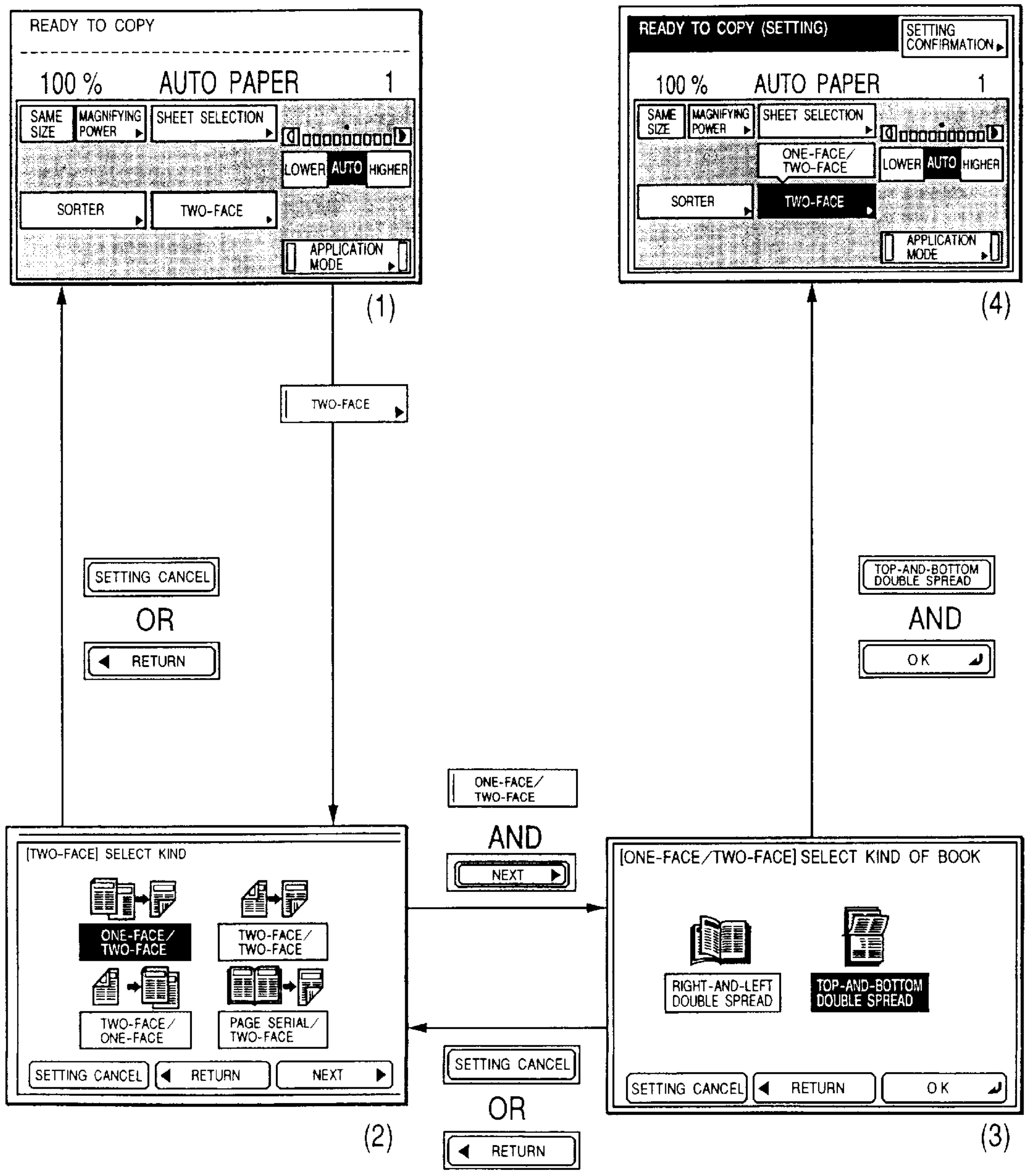
FIG. 14 shows one example of the transition from one screen to another displayed on the liquid crystal display console unit when setting a two-face function.

Referring to FIG. 14, there is shown a flow chart illustrating one example of the transition from one screen to another displayed on the liquid crystal display console unit 310 when performing two-face (one-face to two-face/top-and-bottom double spread) settings. In the flow chart, (1) to (4) denote the steps of the transition, and the arrows show that each transition takes place when the keys are depressed whose names are appended to the arrows. The subsequent screen transition is executed based on the control program stored in ROM 1004*b* by CPU 1004*a*.

First, a two-face function is selected by depressing the TWO-FACE key 412 on the standard screen 400*a* shown in FIG. 4 in step (1), then the transition from step (1) to step (2) takes place and the TWO-FACE KIND SELECTION window 1700*a* is displayed. Depressing the NEXT key 1707 after reversing the screen by depressing the ONE-FACE/TWO-FACE key 1701 of the TWO-FACE KIND SELECTION window 1700*a* causes the transition to step (3) to take place and the DOCUMENT SPREAD KIND SELECTION window 1700*b* to be displayed. After reversing the screen by depressing the TOP-AND-BOTTOM DOUBLE SPREAD key 1712, the OK key 1715 is depressed. This causes the transition to step (4) to take place and the standard screen 400*a* to be displayed. At this time, the TWO-FACE key is reversed, which indicates there exists a setting. In the TWO-FACE SETTING CONTENTS DISPLAY field 414, the kind of the two-face mode having been set is displayed.

Now one example of the flow charts for voice registration of settings will be described with reference to FIG. 15.

Figure 15:
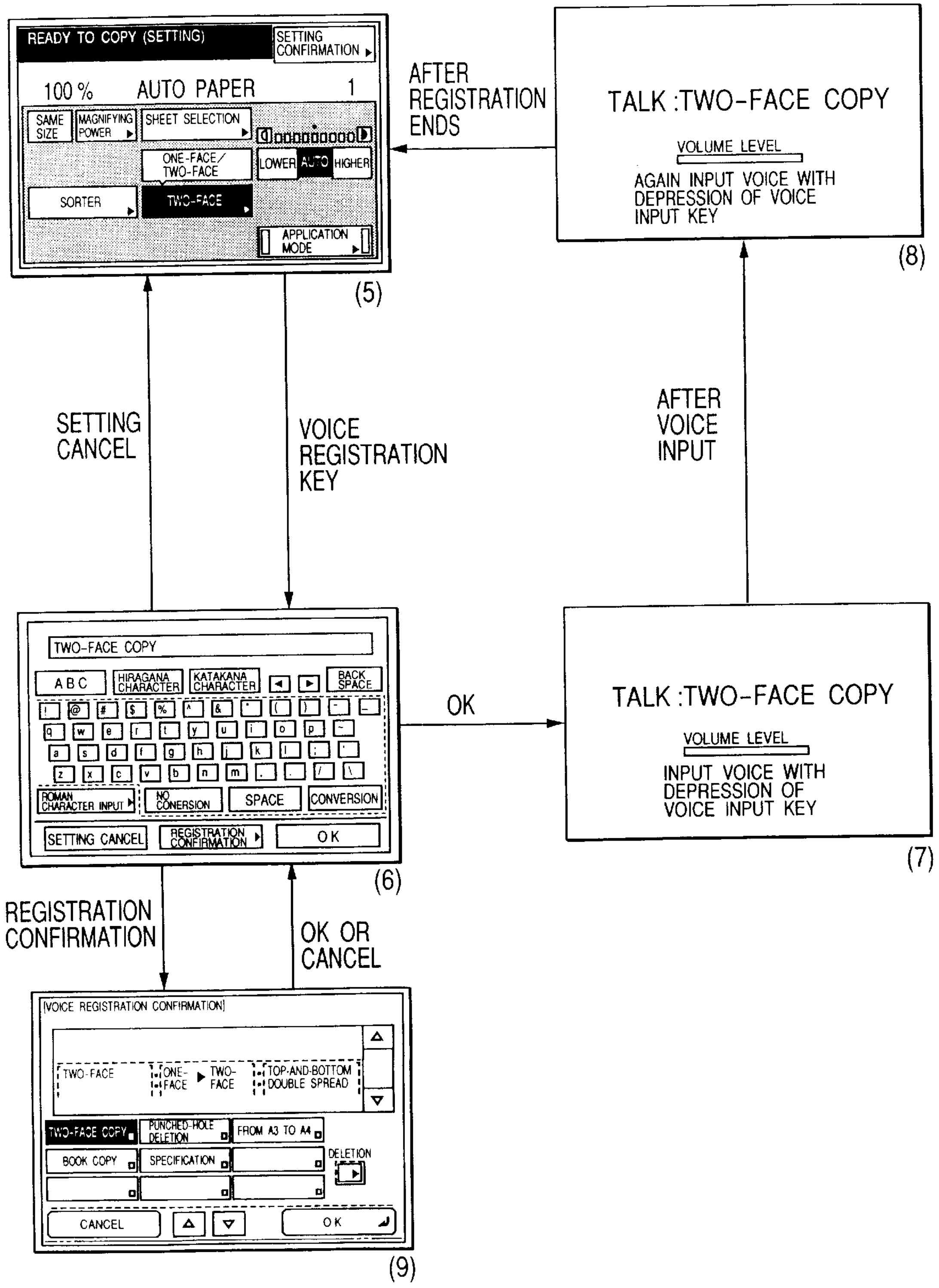
FIG. 15 shows one example of the transition from one screen to another displayed on the liquid crystal display console unit when performing the registration of a copy function/the confirmation of the registration of the same with voice.

Referring to FIG. 15, there is shown a flow chart illustrating the transition from one screen to another displayed on the liquid crystal display console unit 310 where voice registration is performed after attaching a name to the two-face mode (one-face to two-face/top-and-bottom double spread) setting set in FIG. 14. (5) to (9) denote each step of the voice registration, respectively.

Step (5) shows a screen where the two-face (one-face to two-face/top-and-bottom double spread) mode setting of step (4) in FIG. 14 is terminated. When depressing the VOICE REGISTRATION key 313 shown in FIG. 3 in step (5), the transition to step (6) takes place and the NAME REGISTRATION window 700*c* is displayed, which allows the registration name to be input. When depressing the OK key 706 after ending name registration in step (6), the transition to step (7) takes place and the VOICE INPUT window 700*b* is displayed. In step (7), voice is registered as long as the VOICE INPUT key 311 is depressed. When voice input is terminated in step (7), the transition to step (8) takes place and the VOICE RE-INPUT window 700*c* is displayed which requires voice re-input for confirmation, and voice input is performed in the same manner as step (7). When voice input is terminated, the transition to step (5) takes place.

Then one example will be explained of the transition from one screen to another displayed on the liquid crystal display console unit 310 which takes place in confirmation of registration contents.

When depressing the VOICE REGISTRATION key 313 shown in FIG. 3 in step (5), the transition to step (6) takes place and the NAME REGISTRATION window 700*a* is displayed. When depressing the REGISTRATION CONFIRMATION key 709, the transition to step (9) takes place and the VOICE REGISTRATION CONFIRMATION window 700*d* is displayed. When depressing the named key to be checked, the registration contents corresponding to the selected REGISTRATION NAME key is displayed on the REGISTRATION CONTENTS DISPLAY field 712.

One example of the flow charts for calling the registered name will be described now.

Figure 16:
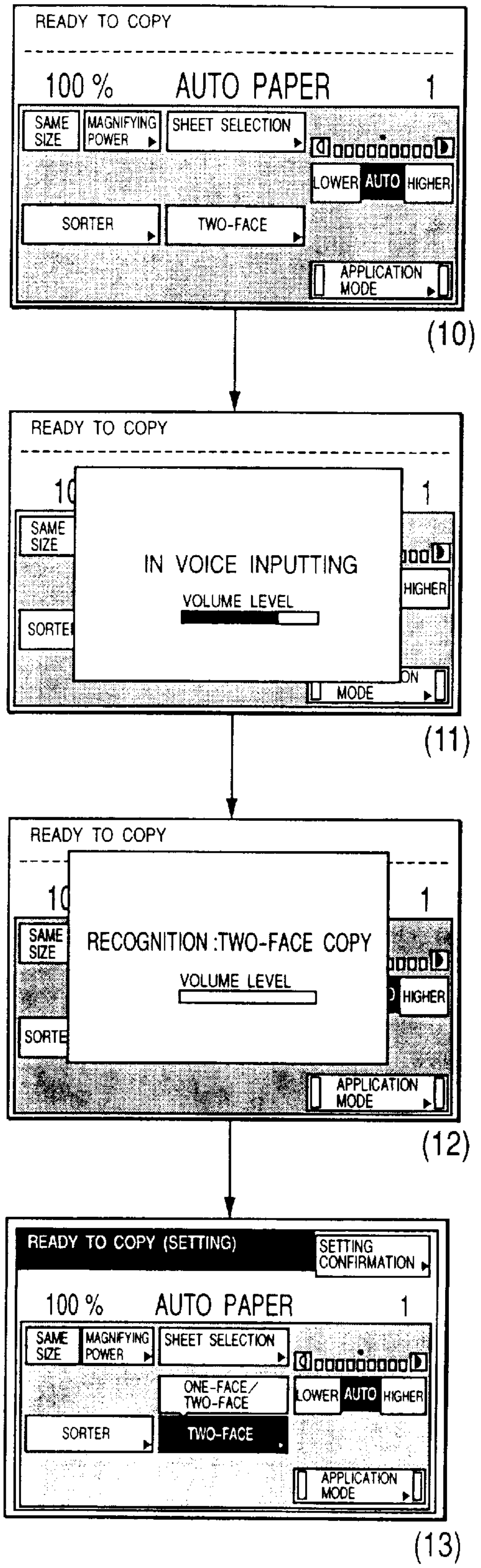
FIG. 16 shows one example of the transition from one screen to another displayed on the liquid crystal display console unit when calling the registered copy function with voice.

Referring to FIG. 16, in step (10) where the standard screen 400*a* is displayed on the liquid crystal display console unit 310, when performing voice input from microphone 312 while depressing the VOICE INPUT key 311, the transition to step (11) takes place and the VOICE INPUT window 2000*a* is displayed. In step (12) the voice of higher recognition rate among the registered voices is displayed, and in step (13) the corresponding function is set and the standard screen 400*a* is displayed.

While the embodiment has been described in terms of the case where voice of a higher recognition rate is displayed, the equipment may be constructed in such a manner that a user can freely set the recognition rate considered to be valid according to the circumstances where he/she uses it.

While the embodiment has been described in terms of the case where the functions called by voice input are overwritten onto the various functions set on the standard screen 400*a* in step (10) to step (13), the equipment may be constructed in such a manner that a user can determine the functions to be selected by carrying on a dialogue with the equipment, when the functions called by voice input overlap the functions set on the standard screen 400*a*.

Figure 17:
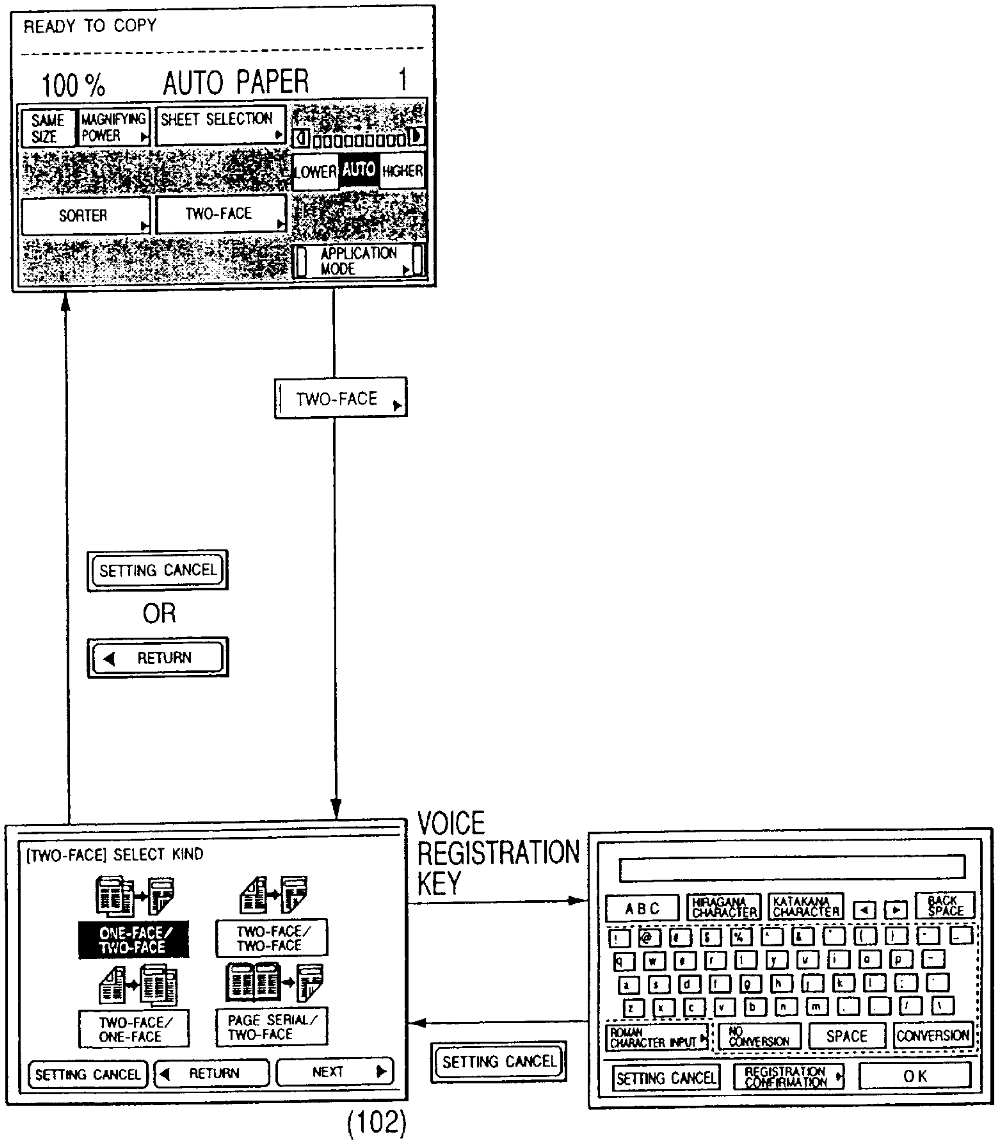
FIG. 17 shows one example of the transition from one screen to another displayed on the liquid crystal display console unit when performing the registration of screens in the middle of a copy function setting with voice.

In the above description, voice registration is performed while selecting the two-face mode to the very end. As shown in FIG. 17, voice registration, however, may be performed by depressing the VOICE REGISTRATION key and displaying the NAME REGISTRATION window, while allowing the set screen of step (12) to be displayed where the kind of two-face modes at step (102) is selected. In the case of performing calling by voice input, the screen is displayed on the liquid crystal display console unit 310 where the kind of two-face modes is selected. As for other kinds of image formation modes, voice registration can be similarly performed for the selection screen on the way of setting of the image formation mode.

Figure 18:
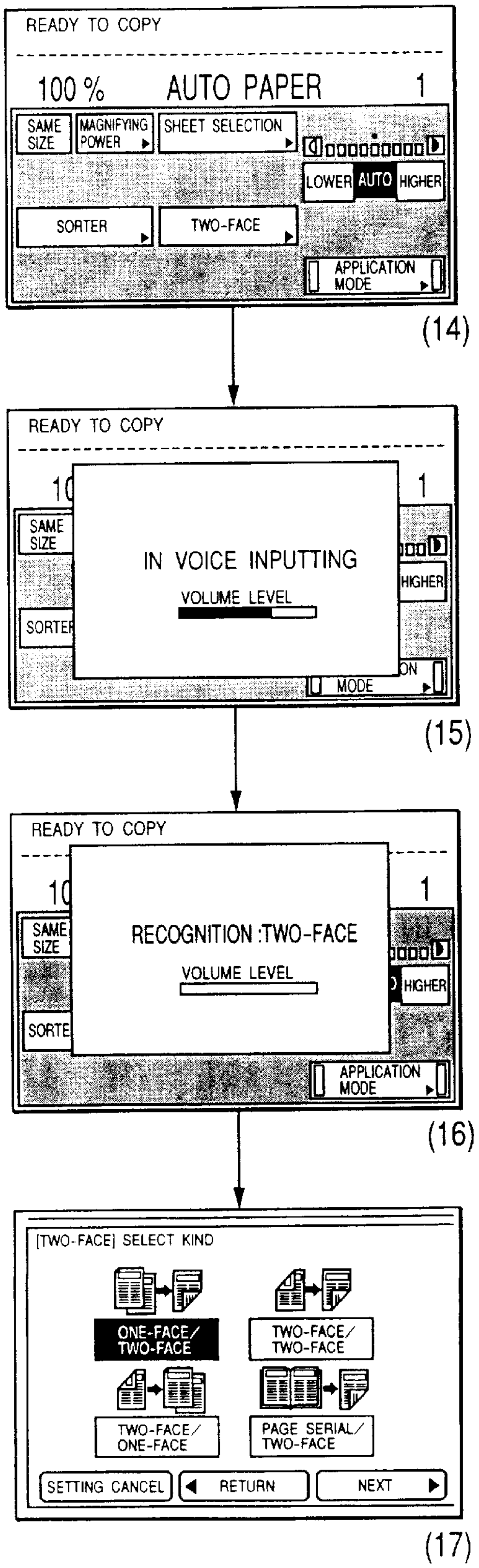
FIG. 18 shows one example of the transition from one screen to another displayed on the liquid crystal display console unit when calling the voice data of an unspecified number of speakers previously registered.

Referring to FIG. 18, there is shown an example of the screens displayed on the liquid crystal display console unit 310 in the case where the voice data of an unspecified number of speakers and the copy functions are mapped into the nonvolatile memory 1004*d* shown in FIG. 2 at the time of preciously delivering the product.

In step (14) where the standard screen 400*a* is displayed on the liquid crystal display console unit 310, when performing voice input through microphone 312 with the VOICE INPUT key 311 shown in FIG. 3 being depressed, the transition to step (15) takes place and the VOICE INPUT window 2000*a* is displayed. The voice of higher recognition rate among the registered voices is allowed to be displayed in step (16), and a dialogue screen similar to the case where two-face key 412 is depressed is allowed to be displayed in step (17). That is, since a SORTER key 411, a TWO-FACE key 412, a MAGNIFYING POWER key 416, and a SHEET SELECTION key 410 shown in FIG. 4 and the voice data corresponding to each key shown in FIG. 5 are previously registered, the same dialogue screen as when depressing the keys can be displayed by voice input.

When the recognition rate of the data registered by an unspecified number of speakers is low, the rate is expected to improve by an additional registration of one's personal voice.

Figure 19:
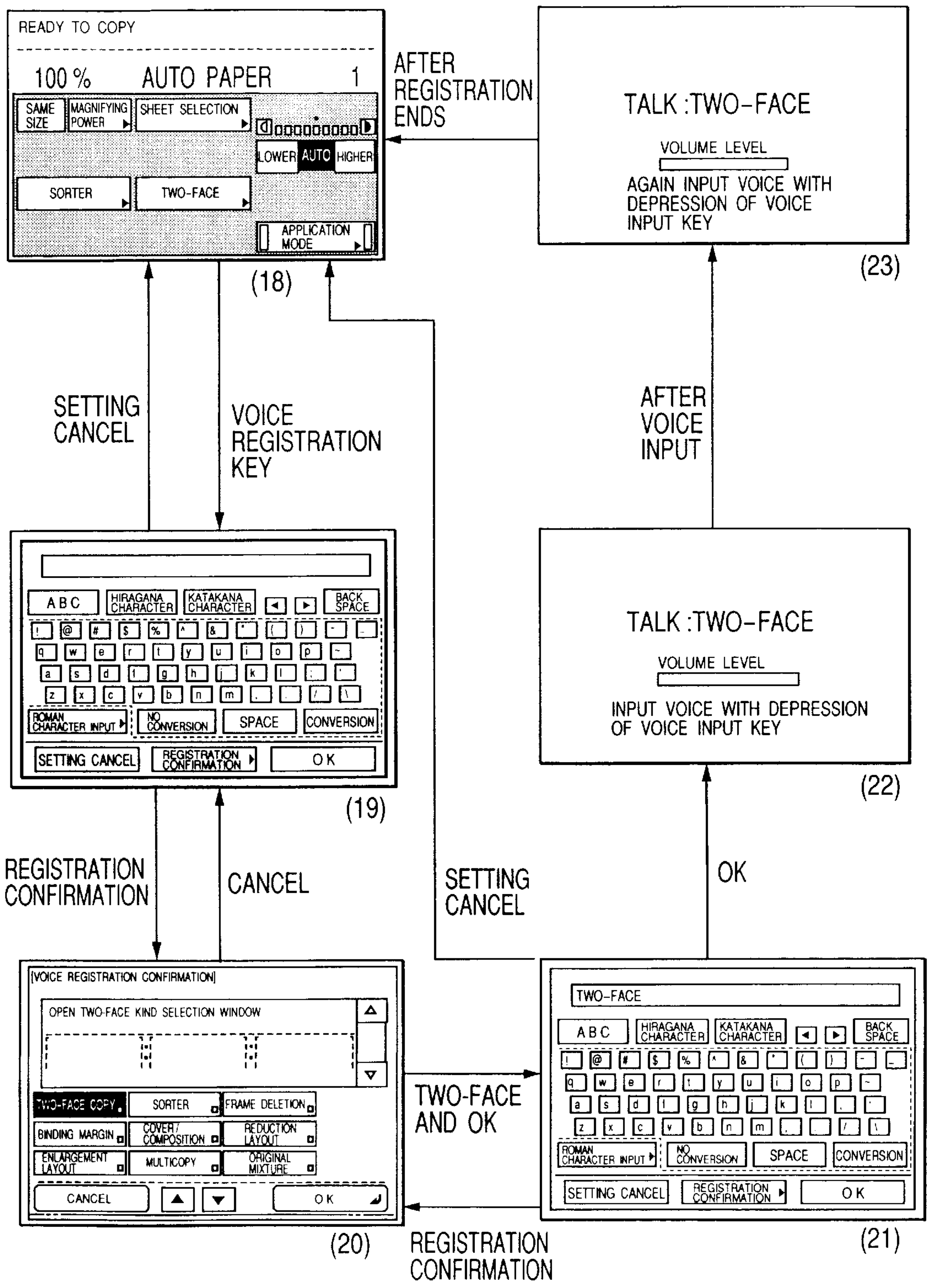
FIG. 19 shows one example of the transition from one screen to another displayed on the liquid crystal display console unit when performing the registration of the operator's voice in addition to the voice data of an unspecified number of speakers previously registered.

Referring to FIG. 19, there is shown an example of the screens displayed on the liquid crystal display console unit 310, when performing an additional voice registration.

In step (18) where the standard screen 400*a* is displayed on the liquid crystal display console unit 310, when depressing the VOICE REGISTRATION key 313 shown in FIG. 3, the transition to step (19) takes place and the NAME REGISTRATION window 700*a* is displayed. In the step (19), when depressing the REGISTRATION CONFIRMATION key 709 shown in FIG. 3, the transition to step (20) takes place and the REGISTRATION CONFIRMATION window 700*d* is displayed. When depressing the key having the function which allows the additional voice registration, the registration contents corresponding to the selected REGISTRATION NAME key is displayed on the REGISTRATION CONTENTS field 712.

If the selected REGISTRATION NAME key is correct, the OK key 716 is depressed. The DELETION key 715 is not displayed here in case the voice data from an unspecified number of speakers is deleted by mistake. In step (21), the name of the selected REGISTRATION CONFIRMATION key is displayed on the CHARACTER DISPLAY field 702. In case the registration name is changed by mistake, a keyboard 701, a CURSOR MOVE key 703, a BACK SPACE key 704, and a ROMAN CHARACTER INPUT key are not displayed. When the voice data displayed on the CHARACTER DISPLAY field 702 is correct and the OK key 706 is depressed, the transition to step (22) takes place and the VOICE INPUT window 700*b* is displayed. In the step (22), voice is registered as long as the VOICE INPUT key 311 is depressed. When voice input is terminated in step (22), the transition to step (23) takes place and the VOICE RE-INPUT window 700*c* is displayed. Here voice input is required again for confirmation and voice input is performed in the same manner as in step (22). When terminating voice input, the transition to step (18) takes place.

The voice data registered in steps (5) to (8) shown in FIG. 15 can be also corrected in the same procedure as in steps (18) to (23).

Now the voice registration processing procedure of the embodiment of this invention will be described with reference to the flow chart shown in FIG. 20.

Figure 20:
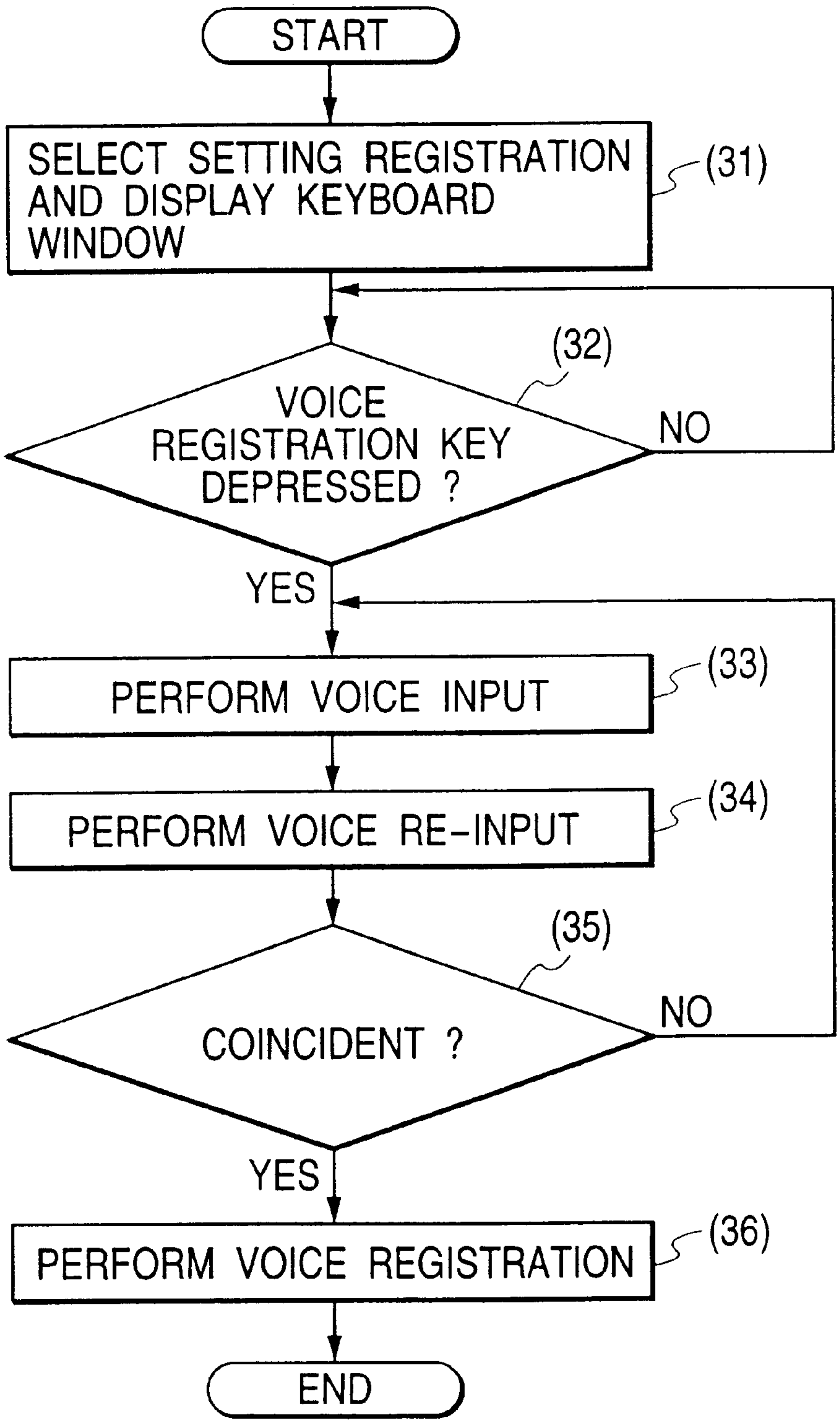
FIG. 20 is a flow chart illustrating one example of the processing sequence of voice registration.

Referring to FIG. 20, there is shown a flow chart illustrating one example of a first data processing procedure in the image production equipment according to the present invention. The flow chart corresponds to the data processing executed based on the control program stored in ROM 1004*b* shown in FIG. 2 by CPU 1004*a*. (31) to (35) indicate each step of the process.

First, the copy function is set and the standard screen 400*a* shown in FIG. 4 is displayed. Then the KEYBOARD window 700*a* shown in FIG. 8 is displayed on the liquid crystal display console unit 310 by depressing the VOICE INPUT key 311 shown in FIG. 3 to allow a user to input any arbitrary registration name.

Then, whether the OK key 706 shown in FIG. 8 has been depressed or not is judged (32). In the case where the judgement is "no", the user has to return to step (32). In case where the judgement is "yes", the user goes to step (33). In step (33), the VOICE INPUT window 700*b* shown in FIG. 9 is displayed on the liquid crystal display console unit 310, and the voice input from the microphone 312 is input into the control circuit 1004 after it is converted to digital signals via the A/D conversion unit 213, shown in FIG. 2 while the VOICE INPUT key 311 shown in FIG. 3 is depressed.

Then, in step (34), the VOICE RE-INPUT window 700*c* shown in FIG. 10 is displayed on the liquid crystal display console unit 310, and the voice input from the microphone 312 is input into the control circuit 1004 for confirmation after it is converted to digital signals via the A/D conversion unit 213 shown in FIG. 2, while the VOICE INPUT key 311 shown in FIG. 3 is depressed. In step (35), the voice input in step (34) and the voice input in step (35) are compared to each other to confirm whether two pieces of input information are the same or not. If there is any difference between the two, the voice input is repeated to enhance the accuracy of the data.

In step (36), the voices input and converted to digital signals in step (33) and selected memory keys are mapped into the nonvolatile memory 1004*d* shown in FIG. 2, before ending the process.

Then one example of a mode calling procedure by voice input according to the embodiment of this invention will be described with reference to the flow chart shown in FIG. 21.

Figure 21:
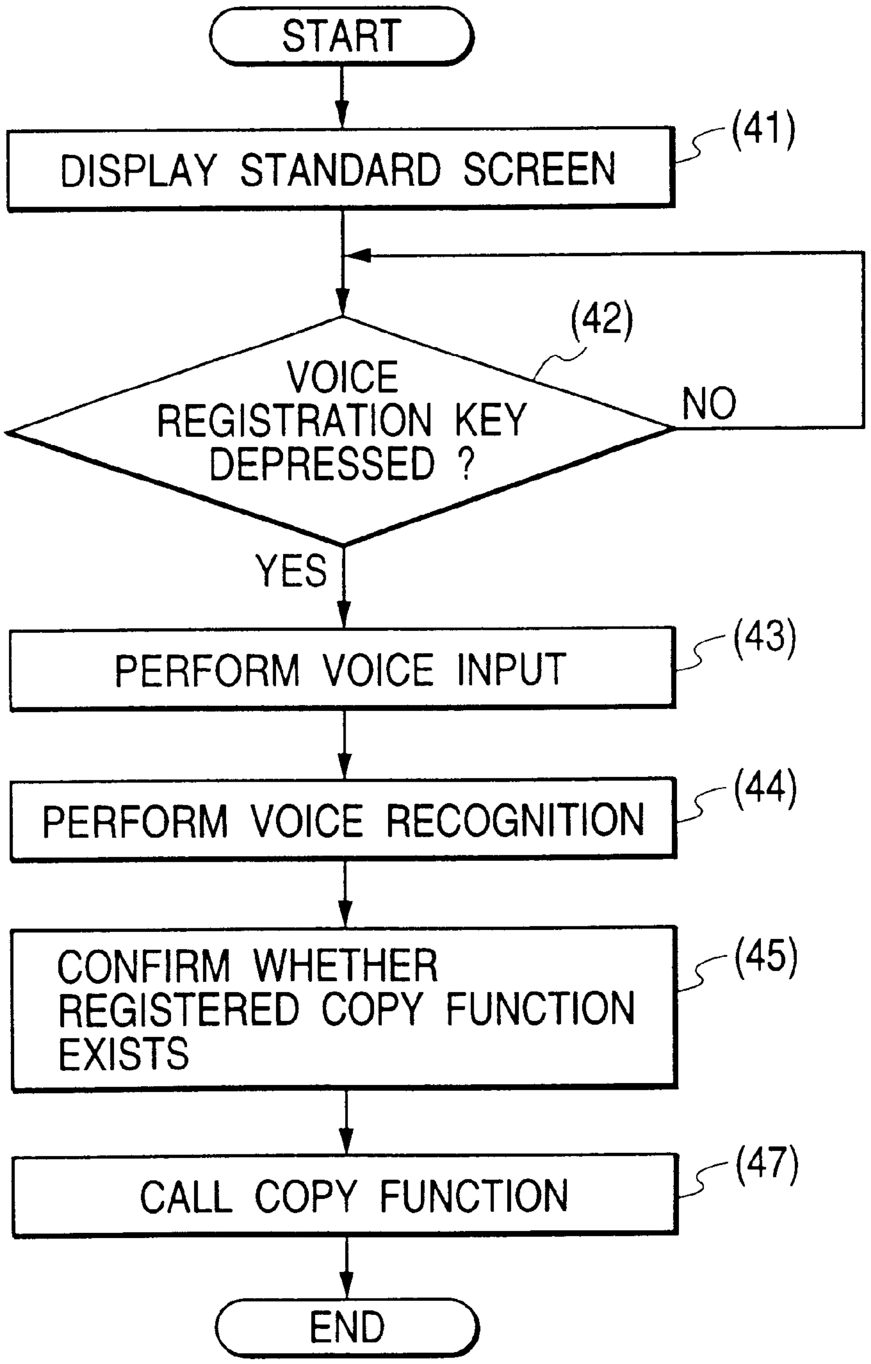
FIG. 21 is a flow chart illustrating one example of the processing sequence of voice recognition.

Referring to FIG. 21, there is shown a flow chart illustrating one example of a second data processing procedure in the image production equipment according to the present invention. The flow chart corresponds to the data processing executed based on the control program stored in ROM 1004*b* shown in FIG. 2 by CPU 1004*a*. (41) to (47) indicate each step of the process.

First, the standard screen shown in FIG. 4 is displayed on the liquid crystal display console unit 310 (41). Then, whether the VOICE REGISTRATION key 313 shown in FIG. 3 has been depressed or not is judged (42). In case where the judgement is "no", the user has to return to step (42). In case where the judgement is "yes", the user goes to step (43).

In step (43), the voice input from the microphone 312 is input into the control circuit 1004 via the gain control circuit 212 and the A/D conversion unit 213, while the VOICE REGISTRATION key 313 being depressed.

In step (44), the input voices in step (43) and the voices to be registered at the nonvolatile memory 1004*d* shown in FIG. 2, each of which is given each registration name, are compared to each other to execute voice recognition.

In step (45), the voices having been subjected to voice recognition and the voices to be registered are compared to each other to confirm whether there exists a copy function or not.

If the copy function corresponding to the input voice is not registered, the process is terminated. The fact that the corresponding copy function is not registered can be displayed on the liquid crystal display console unit 310.

In step (47), the copy function corresponding to the voice input in step (43) is called, and displayed on the standard screen 400*a* before ending the process.

Thus, according to the above embodiment, in a copy function setting, it is unnecessary to depress a plurality of keys one by one to search the group to which the function to be set belongs, and the use of voice recognition enables the operator to call the desired function with an easier operation. This is effective in reducing the operator's workload.

While the embodiment has been described in terms of the case where a copy mode is registered by voice input, a copy function may be called using a conventional method. That is, a voice input is registered for each registered copy mode which is allocated one mode memory key, and a copy mode is called by the voice recognition. The procedure will be described below.

Figure 22:
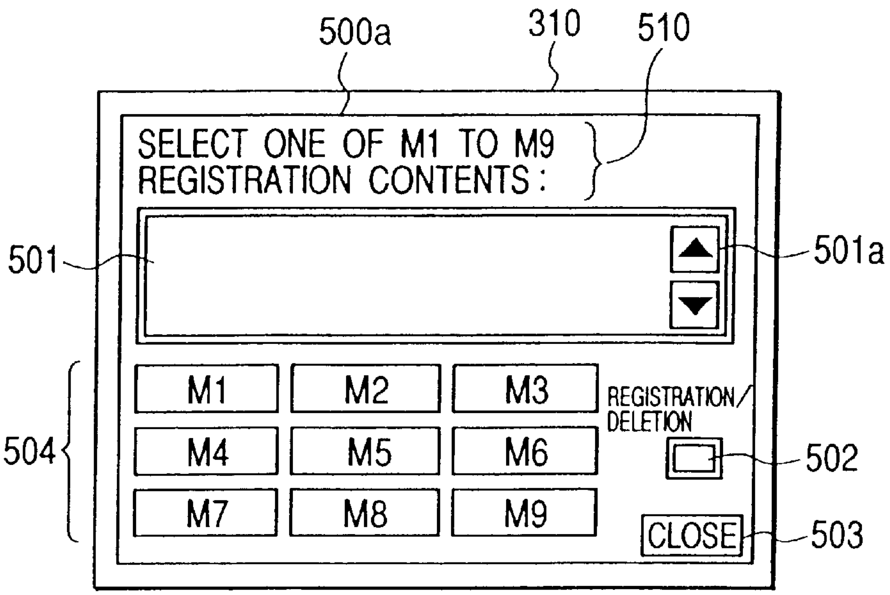
FIG. 22 shows a mode memory registration/calling screen.

Referring to FIG. 22, numeral 500*a* denotes a MODE MEMORY window, which is displayed when depressing the mode memory key 440 on the application mode screen 400*b* shown in FIG. 5.

Numeral 501 denotes a REGISTRATION CONTENTS DISPLAY field. When any one key selected from the memory key group 504, consisting of memory keys M1 to M9, is depressed and is reversed, the registration contents corresponding to the selected memory key is displayed on the field 501. All the memory keys M1 to M9 of the memory key group 504 are ON/OFF keys. Numeral 501*a* denotes a SCROLL key, which is depressed when the registration contents do not fit in the REGISTRATION CONTENTS DISPLAY field 501, so that all the contents can be displayed by scrolling the contents file. The number of the mode memory keys is not limited to nine, and more keys are applicable.

Numeral 502 denotes a REGISTRATION/DELETION key, which is depressed when setting a copy mode or when deleting the registered copy mode. Numeral 503 denotes a CLOSE key. When depressing this key, the application mode screen 400*b* shown in FIG. 5 is displayed on the liquid crystal display console unit 310. Numeral 510 denotes a DIRECTION DISPLAY field, in which, for example, input directions to an operator are displayed.

In some cases, the REGISTRATION/DELETION key 502 and the CLOSE key 503 are not displayed, as described below, and an OK key and a CANCEL key are displayed.

Figure 23:
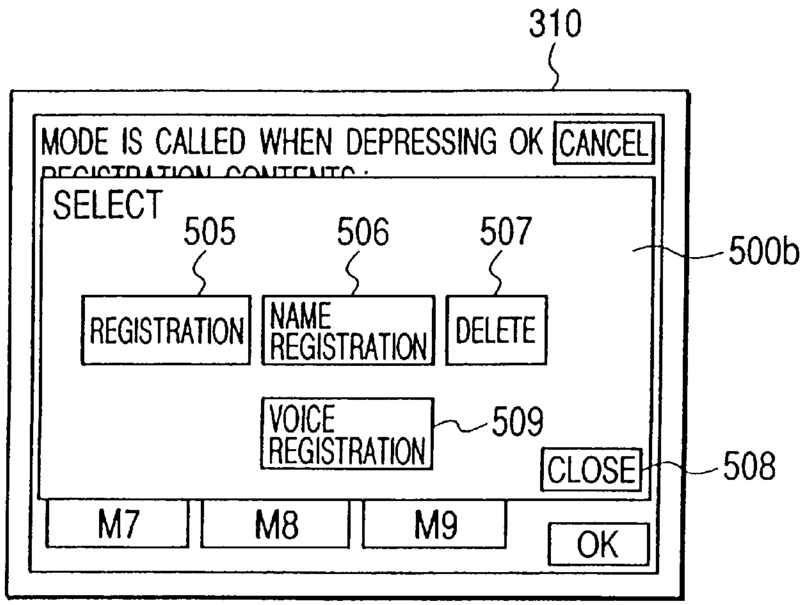
FIG. 23 shows one example of a mode memory registration screen.

Referring to FIG. 23, numeral 500*b* denotes a SELECTION window, which is displayed on the liquid crystal display console unit 310 when depressing the REGISTRATION/DELETION key 502 on the MODE MEMORY window 500*a* shown in FIG. 22. Numeral 505 denotes a REGISTRATION key, which is depressed when registering a copy mode at a mode memory. Numeral 506 denotes a NAME REGISTRATION key, which is depressed when registering the name of the copy mode registered at the mode memory. Numeral 507 denotes a DELETION key, which is depressed when deleting the copy mode registered at the mode memory. Numeral 509 denotes a VOICE REGISTRATION key, which is depressed when performing voice registration for the copy mode registered at the mode memory. Numeral 508 denotes a CLOSE key. When depressing this key, the SELECTION window 500*b* is closed and the MODE MEMORY window 500*a* shown in FIG. 22 is displayed on the liquid crystal display console unit 310.

Figure 24:
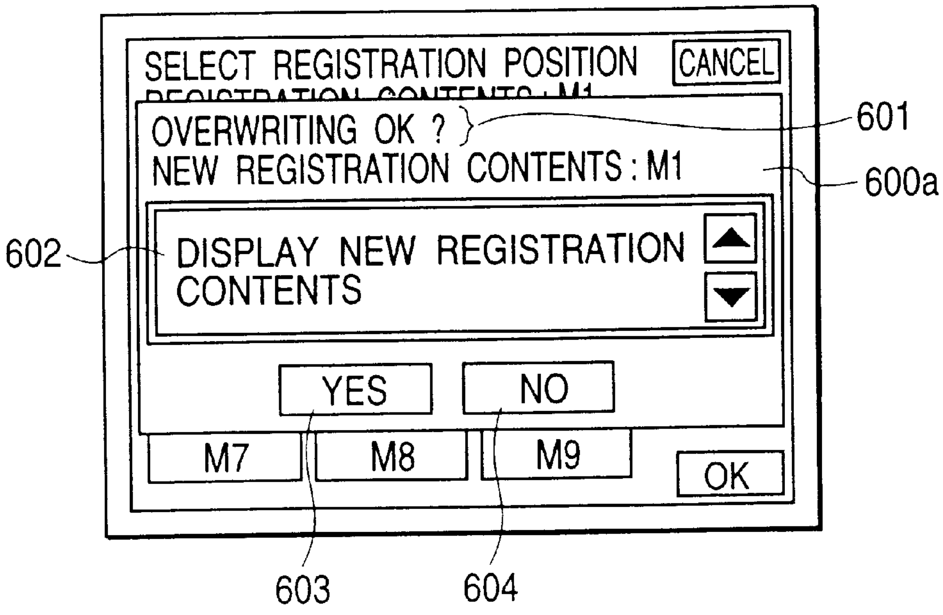
FIG. 24 shows one example of a mode memory registration screen.

Referring to FIG. 24, numeral 600*a* denotes a CONFIRMATION window, which is displayed so that an operator can confirm the subsequent processes, such as copy mode registration, copy mode deletion and so on, before executing them. Numeral 601 denotes a CONFIRMATION CONTENTS DISPLAY field, in which a message for confirming the subsequent process is displayed. Numeral 602 denotes a REGISTRATION CONTENTS DISPLAY field, in which the new registration contents is displayed, when newly registering, and the registration contents to be deleted is displayed, when deleting a copy mode. Numeral 603 denotes an EXECUTION key, which is depressed when directing the execution of a process. Numeral 604 denotes an ABORT key, which is depressed when aborting the execution of processes.

Figure 25:
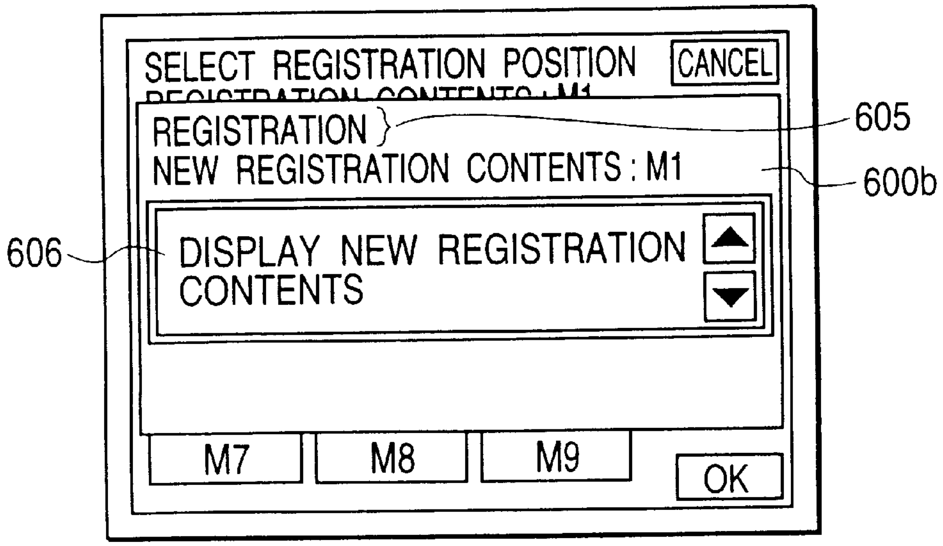
FIG. 25 shows one example of a mode memory registration screen.

Referring to FIG. 25, numeral 600*b* denotes a REPORT window, which displays the completion of the processing directed. Numeral 605 denotes a REPORT CONTENTS DISPLAY field, in which the contents of the executed process are displayed. Numeral 606 denotes a REGISTRATION CONTENTS DISPLAY field, in which the contents of the copy mode to be registered are displayed.

Now one example of the flow charts illustrating the sequence of the voice registration for the copy mode that has been registered at a mode memory key will be discussed with reference to FIGS. 26 and 27.

Figure 26:
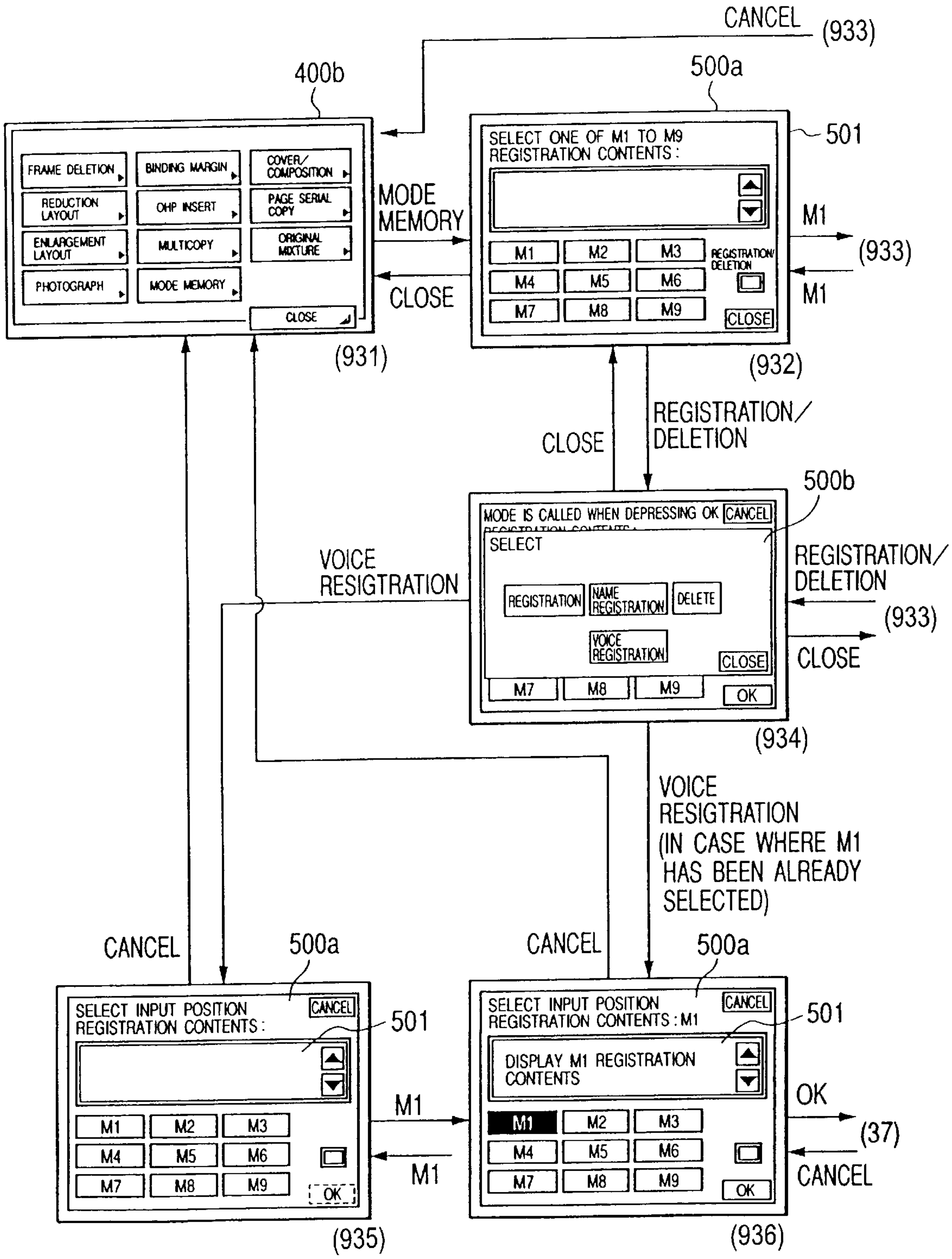
FIG. 26 shows one example of the transition from one screen to another displayed on the liquid crystal display console unit when performing the copy mode registration and the voice registration at mode memory.
Figure 27:
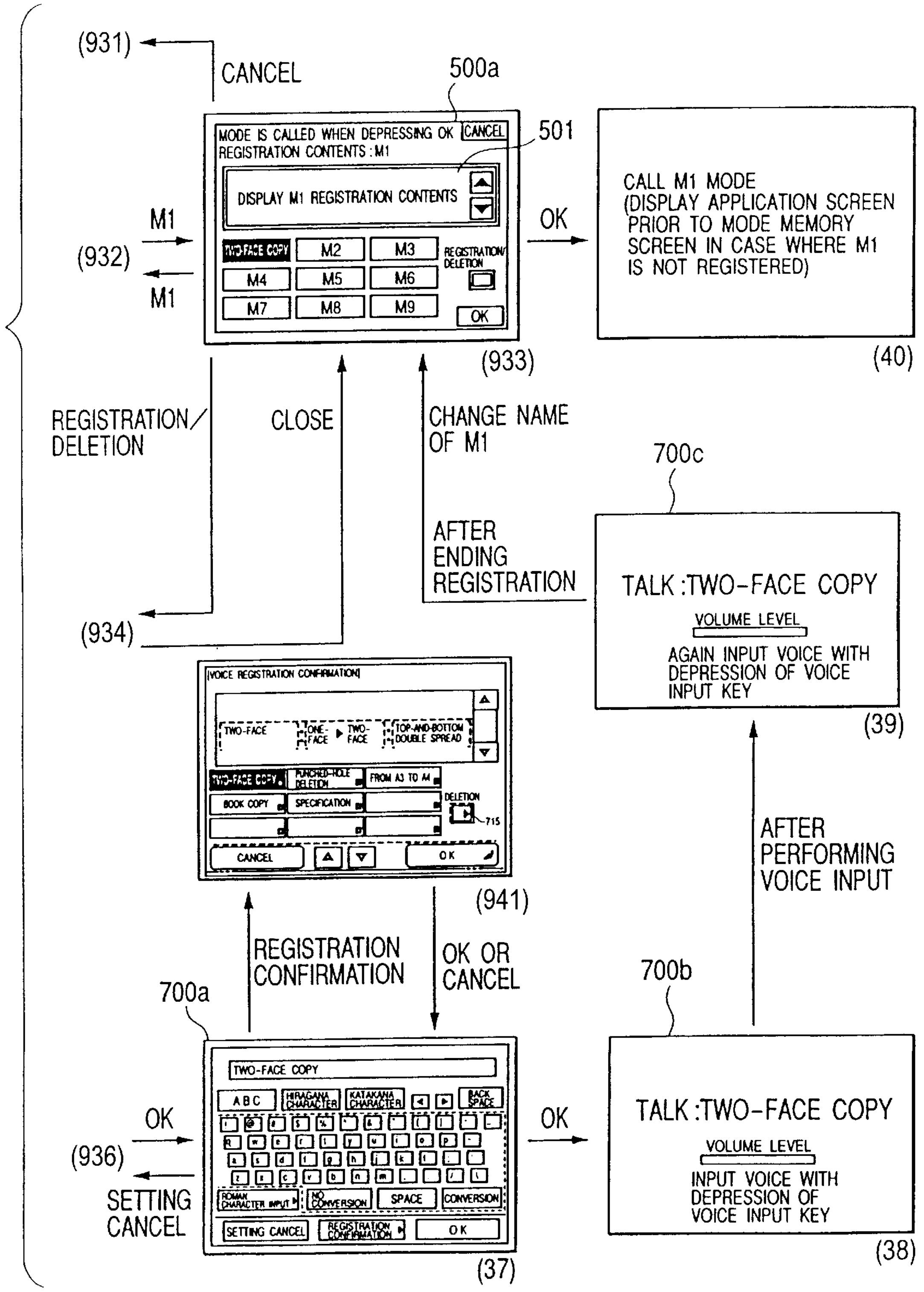
FIG. 27 shows one example of the transition from one screen to another displayed on the liquid crystal display console unit when performing the copy mode registration and the voice registration at mode memory.

Referring to FIGS. 26 and 27, there are shown flow charts each illustrating one example of the transition from one screen to another displayed on the liquid crystal display console unit 310 when registering a name for each of the memory keys M1 to M9. (31) to (40) indicate each of the transition steps.

First, when a mode memory is selected by depressing the MODE MEMORY key 440 at step (931), the transition to step (932) takes place and the MODE MEMORY window 500*a* is displayed. Then, when the REGISTRATION/DELETION key 502 on the MODE MEMORY window 500*a* is depressed, the transition to step (934) takes place and the SELECTION window 500*b* is displayed.

Since name registration is being performed here, the NAME REGISTRATION key is depressed and NAME REGISTRATION is selected.

Then the transition to step (935) takes place, and the MODE MEMORY window 500*a* is displayed. Since the step (935) is a step for selecting a position for registering a name, "SELECT INPUT POSITION" is displaced on the DIRECTION DISPLAY field 501. When any one of the memory keys M1 to M9 (for example memory key M1) is depressed so as to select one key for name registration from the memory key group 504, the transition to step (936) takes place and the contents of the copy mode registered at the memory key M1 is displayed on the REGISTRATION CONTENTS DISPLAY field 501.

On the MODE MEMORY window 500*a* displayed in steps (935) and (936), the REGISTRATION/DELETION key 502 and the CLOSE key 503 are not displayed, but the OK key (this is shown with dotted line in step (935)) and the CANCEL key are displayed.

When the OK key is depressed in step (936), the transition to step (37) takes place and the KEYBOARD window 700*a* shown in FIG. 8 is displayed. Then a new name is registered. When the OK key 706 is depressed in step (37), the transition to step (38) takes place and the VOICE INPUT window 700*c* is displayed. In this step (38), a voice input is registered as long as the VOICE INPUT key 311 shown in FIG. 3 is depressed. When voice input is completed in step (38), the transition to step (39) takes place and the VOICE RE-INPUT window 700*c* is displayed. At this point, voice input is requested again for confirmation, and voice input is performed in the same manner as in step (38). When voice input is completed, the transition to step (933) takes place. When the REGISTRATION CONFIRMATION key 709 is depressed in step (37), the transition to step (941) takes place and the contents of the copy mode registered is displayed in the same manner as above.

When the NAME REGISTRATION key 506 is depressed in step (934), the KEYBOARD screen almost the same as shown in FIG. 8 is displayed. If only a name is input and the OK key 706 is depressed, the transition to step (933) after the registration of the name alone is also made possible.

In step (933) the MODE MEMORY window 500*a* is displayed, and in steps (37) to (39) the memory key for which name and/or voice registration have been performed (in this case, M1) is reversed, that is, in an optional condition. And on the REGISTRATION CONTENTS DISPLAY field 501 the contents of the copy mode registered for the memory key in an optional condition (memory key M1) are displayed. On the MODE MEMORY window 500*a* displayed in step (933), the CLOSE key is not displayed, but the OK key and the CANCEL key are displayed.

When the OK key 706 is depressed in step (933), the transition to step (40) takes place and the standard screen 400*a* shown in FIG. 4 is displayed. When the memory key to be reversed has not yet been subjected to name registration, the application mode screen 400*b* is displayed.

The name and voice registrations can be thus performed. When the OK key 706 is depressed in the state where no character has not been input yet, the screen returns to the names of the default ("M1", "M2", . . . , "M9"). When the KEYBOARD window 700*a* is displayed by selecting the memory key for which a name has been already registered, the name registered is displayed on the CHARACTER DISPLAY field 702.

The read out by voice input of the copy mode registered at the mode memory is performed in the same manner as above. When copy modes registered for each mode memory key are deleted, the voices registered are not deleted and can be subsequently called through voice recognition. The registered voices, however, can be deleted on a voice registration confirmation screen.

The equipment may be configured in such a manner that the voices registered at memory keys are deleted in connection with the deletion of the copy modes registered for each mode memory key.

The VOICE REGISTRATION key 509 on the screen in step (933) shown in FIG. 26 may be provided, for example, on the screen in step (37) shown in FIG. 27. In this case, when the NAME REGISTRATION key is depressed in step (933), the transition to step (935) or to step (936) takes place, and when the NAME REGISTRATION key is depressed in step (37), the transition to step (38) takes place.

While the embodiment has been described in terms of a copying equipment, the above embodiment is applicable to a printer or a combined reproduction equipment having, for example, a copy function, a print function and a facsimile function. In this case, the equipment is constructed in such a manner that not only a copy mode but such process modes as a print mode and a facsimile mode, which can be set for a combined reproduction equipment, are registered and the registered process modes are called by voice input.

As is apparent from the above description, the objects of the present invention can also be accomplished in such a manner that a storage medium recording a program code of software implementing the functions of the embodiment is supplied to a system or equipment, then the computer (or CPU, MPU) of the system or equipment reads and executes the program code stored in the storage medium.

In this case, the program code read from the storage medium itself implements the new functions of the present invention, while the storage medium storing the program code constitutes the invention.

The storage medium used for supplying a program code includes, for example, a floppy disk, a hard disk, an optical disk, a magneto-optic disk, CD-ROM, CD-R, a magnetic tape, a nonvolatile memory card, an ROM and an EEPROM.

It is also apparent that the aforementioned functions of the embodiment are implemented not only by the computer which reads and executes the program code, but also by the OS (operating system) on the computer which performs all or a part of the actual processing based on the instruction of the program code.

It is also apparent that the aforementioned functions of the embodiment are implemented by the function extension board inserted into the computer as well as the function extension unit connected to the computer whose memory stores the program code read from the storage medium and whose CPU performs all or a part of the actual processing based on the instructions of the program code.

The present invention may be applied to a system consisting of a multiple pieces of equipment or to a unit consisting of a single piece of equipment. Apparently the present invention is applicable to a system or equipment in which the invention is implemented by supplying a program thereto. In this case, the system or equipment can enjoy the effect of the present invention by reading the program embodied in software for implementing the present invention through the storage medium storing the program.

Further, the system or equipment can enjoy the effect of the present invention by reading the program embodied in software for implementing the present invention through a communication program which downloads the program from the data base on a network.

What is claimed is:

1. An image production equipment comprising:

a plurality of operation keys for setting image production modes;

a memory for storing an image production mode set by said operation keys;

voice inputting means for inputting voice;

registering means for registering the voice input by said voice inputting means for the image production mode stored in said memory, in a registration mode;

name inputting means for inputting a name for the image production mode stored in said memory or for the voice registered by said registering means, wherein said registering means registers the name input by said name inputting means for the registered voice or the registered image production mode;

voice comparing means for comparing the voice unit by said voice inputting means with the voice registered by said registering means, in a call mode; and controlling means for controlling a call to an image production mode corresponding to the input voice based on the result from said voice comparing means.

2. An image production equipment according to claim 1, further comprising contents displaying means for displaying the contents of the image production mode called by said controlling means.

3. An image production equipment according to claim 1, further comprising confirming means for displaying contents of the image production mode for the name registered by said registering means.

4. An image production equipment according to claim 3, further comprising key-display-controlling means for displaying a key for the registered name on a touch panel display, wherein said confirming means displays the contents of the image production mode in response to the operation of the displayed key.

5. An image production equipment according to claim 1, further comprising name displaying means for displaying the name at the time of inputting voice for voice registration.

6. An image production equipment according to claim 1, further comprising name displaying means for displaying a name for the input voice based on the result from said comparing means.

7. An image production equipment comprising:

a plurality of operation keys for setting various image production modes;

a plurality of call keys for calling the image production modes;

image production mode registering means for registering each of the image production modes set by the operation keys for each of the call keys;

voice inputting means for inputting voice;

voice registering means for registering each of the voices input by said voice inputting means for each of the image production modes registered by said image production mode registering means, in a registration mode;

voice comparing means for comparing the voice input by said voice inputting means with each of the voices having been registered by said voice registering means, in a call mode; and controlling means for controlling a call to an image production mode corresponding to the input voice based on the result from said voice comparing means, instead of the operation of the call keys.

8. An image production equipment according to claim 7, further comprising:

name inputting means for inputting a name for each of the image production modes registered by said image production mode registering means or for each of the voices registered by said voice registering means; and name registering means for registering the name input by said name inputting means for each of the image production modes or each of the voices.

9. An image production equipment according to claim 8, further comprising confirming means for displaying contents of the image production mode corresponding to the name registered by said name registering means.

10. An image production equipment according to claim 9, further comprising key-display controlling means for displaying a key corresponding to the registered name on a touch panel display, wherein said confirming means displays the contents of the image production mode in response to the operation of the displayed key.

11. An image production equipment according to claim 7, further comprising contents displaying means for displaying contents of the image production mode called by said controlling means.

12. An image production equipment comprising:

displaying means;

specifying means for specifying the kind of an image production mode to be set;

display controlling means for causing said displaying means to display a selection screen for selecting parameters in the kind of an image production mode specified by said specifying means;

voice inputting means for inputting voice;

voice registering means for registering the voice input by said voice inputting means for the selection screen in a registration mode;

voice comparing means for comparing the voice input by said voice inputting means with the voice registered by said registering means in a call mode; and controlling means for causing said displaying means to display the selection screen corresponding to the input voice based on the result from said voice comparing means.

13. An image production equipment according to claim 12, wherein said displaying means is a touch panel display.

14. An image production equipment according to claim 12, wherein said voice registering means registers the voice input by said voice inputting means for the selection screen which is being displayed by said displaying means.

15. A method for controlling image production equipment having a plurality of operation keys for setting various image production modes, said method comprising the steps of:

registering an image production mode set by the operation keys;

inputting voice in a registration mode;

registering the input voice for the registered image production mode;

inputting a name for the registered image production mode or the registered voice;

registering the input name for the voice or the image production mode;

inputting voice in a call mode;

comparing the input voice with the registered voice; and controlling a call to an image production mode corresponding to the input voice based on the comparison result.

16. A method according to claim 15, further comprising the step of displaying contents of the called image production mode.

17. A method according to claim 15, further comprising the step of displaying contents of the image production mode corresponding to the registered name.

18. A method according to claim 17, further comprising the step of displaying the key corresponding to the registered name on a touch panel display, the contents of the image production mode being displayed in response to the operation of the displayed key.

19. A method according to claim 15, further comprising the step of displaying the name at the time of inputting voice for voice registration.

20. A method according to claim 15, further comprising the step of displaying the name corresponding to the input voice based on the result of said comparison step.

21. A method for controlling image production equipment having a plurality of operation keys for setting various image production modes and a plurality of call keys for calling the image production modes, said method comprising the steps of:

registering each of the image production modes set by the operation keys for each of the call keys;

inputting voice corresponding to each of the registered image production modes in a registration mode;

registering each of the input voices for each of the registered image production modes;

inputting voice in a call mode;

comparing the input voice with each of the registered voices; and controlling a call to an image production mode corresponding to the input voice based on the comparison result, instead of the operation of the call keys.

22. A method according to claim 21, further comprising the steps of:

inputting a name for each of the registered image production modes or for each of the registered voices; and registering each of the input names for each of the image production modes or each of the voices.

23. A method according to claim 22, further comprising the step of displaying contents of the image production mode corresponding to the registered name.

24. A method according to claim 23, further comprising the step of displaying the key corresponding to the registered name on a touch panel display, the contents of the image production mode being displayed in response to the operation of the displayed key.

25. A method according to claims 21, further comprising the step of displaying contents of the image production mode called in said controlling step.

26. A method of controlling image production equipment, said method comprising the steps of:

determining the kind of an image production mode to be set;

causing a displaying device to display a selection screen for selecting parameters in the determined kind of an image production mode;

inputting voice corresponding to the selection screen in a registration mode;

registering the input voice for the selection screen;

inputting voice in a call mode;

comparing the input voice with the registered voice; and causing the displaying device to display the selection screen corresponding to the input voice based on the comparison result.

27. A method according to claim 26, wherein the displaying device is a touch panel display.

28. A storage medium storing a computer readable program which controls image production equipment having a plurality of operation keys for setting various image production modes, said program comprising:

mode registering means for registering an image production mode set by the above operation keys;

inputting means for inputting voice;

voice registering means for registering the input voice for the registered image production mode, in a registration mode;

comparing means for comparing the input voice with the registered voice, in a call mode; and controlling means for controlling a call to the image production mode corresponding to the input voice based on the comparison result.

29. A storage medium storing a computer readable program which controls image production equipment having a plurality of operation keys for setting various image production modes and a plurality of call keys for calling the image production modes, said program comprising:

mode registering means for registering each of the image production modes set by the operation keys for each of the call keys;

inputting means for inputting voice;

voice registering means for registering each of the input voices for each of the registered image production modes, in a registration mode;

comparing means for comparing the input voice with each of the registered voices, in a call mode; and controlling means for controlling a call to an image production mode corresponding to the input voice based on the comparison result, instead of the operation of the call keys.

30. A storage medium storing a computer readable, program which controls image production equipment, said program comprising:

determining means determining the kind of an image production mode to be set;

displaying means for causing a displaying device to display a selection screen for selecting parameters in the determined kind of an image production mode;

inputting means for inputting voice;

voice registering means for registering the input voice for the selection screen, in a registration mode;

comparing means for comparing the input voice with the registered voice; and controlling means for causing the displaying device to display the selection screen corresponding to the input voice based on the comparison result.

* * * * *

UNITED STATES PATENT AND TRADEMARK OFFICE
CERTIFICATE OF CORRECTION

PATENT NO. : 6,167,218
DATED : December 26, 2000
INVENTOR(S) : Toshiya Kanazawa et al.

It is certified that error appears in the above-identified patent and that said Letters Patent is hereby corrected as shown below:

Sheet No. 10 of the DRAWINGS,
FIGURE 15, In Step (6), "CONERSION" should read -- CONVERSION --.

Column 1,
Line 56, "thereto" should be deleted.

Column 3,
Line 30, "is" should read -- are --.

Column 5,
Line 65, "appear" should read -- appearing --.

Column 6,
Line 64, "numeric a" should read -- numeric --.

Column 9,
Line 24, "shown 1700a" should read -- 1700a shown --.

Column 10,
Line 39, "key" should read -- keys --.

Column 12,
Line 30, "preciously" should read -- previously --.

Column 13,
Line 39, "In" should read -- In the --.

Column 14,
Lines 9 and 11, "In" should read -- In the --.
Line 16, "being" should read -- is --.
Line 54, "is" should read -- are --.

Column 15,
Line 35, "is" should read -- are --.

Column 17,
Line 48, "of a" should read -- of --.

UNITED STATES PATENT AND TRADEMARK OFFICE
CERTIFICATE OF CORRECTION

PATENT NO. : 6,167,218
DATED : December 26, 2000
INVENTOR(S) : Toshiya Kanazawa et al.

It is certified that error appears in the above-identified patent and that said Letters Patent is hereby corrected as shown below:

Column 18,
Line 22, "con-" should read -- the con- --.

Column 19,
Line 2, "con-" should read -- the con- --.
Lines 13 and 64, "contents" should read -- the contents --.

Column 20,
Lines 34 and 42, "contents" should read -- the contents --.

Column 22,
Line 7, "readable," should read -- readable --.

Signed and Sealed this

Eleventh Day of December, 2001

*Attest:*

Nicholas P. Godici

*Attesting Officer*

NICHOLAS P. GODICI
*Acting Director of the United States Patent and Trademark Office*